United States Patent
Kim et al.

(10) Patent No.: US 10,467,760 B2
(45) Date of Patent: Nov. 5, 2019

(54) SEGMENTING THREE-DIMENSIONAL SHAPES INTO LABELED COMPONENT SHAPES

(71) Applicant: Adobe Inc., San Jose, CA (US)

(72) Inventors: Vladimir Kim, Seattle, WA (US); Aaron Hertzmann, San Francisco, CA (US); Mehmet Yumer, San Jose, CA (US); Li Yi, Stanford, CA (US)

(73) Assignee: Adobe Inc., San Jose, CA (US)

( * ) Notice: Subject to any disclaimer, the term of this patent is extended or adjusted under 35 U.S.C. 154(b) by 183 days.

(21) Appl. No.: 15/440,572

(22) Filed: Feb. 23, 2017

(65) Prior Publication Data
US 2018/0240243 A1    Aug. 23, 2018

(51) Int. Cl.
*G06T 7/162* (2017.01)
*G06T 7/11* (2017.01)

(52) U.S. Cl.
CPC .............. *G06T 7/162* (2017.01); *G06T 7/11* (2017.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2013/0254153 A1* 9/2013 Marcheret ............ G06N 99/005
706/59
2014/0037198 A1* 2/2014 Larlus-Larrondo ...... G06K 9/00
382/159
2018/0174001 A1* 6/2018 Kang ................... G06K 9/6262

OTHER PUBLICATIONS

D. Reniers and A. Telea, "Skeleton-based Hierarchical Shape Segmentation," IEEE International Conference on Shape Modeling and Applications 2007 (SMI '07), Lyon, 2007, pp. 179-188. doi: 10.1109/SMI.2007.33 (Year: 2007).*
van Kaick, O., Tagliasacchi, A., Sidi, O., Zhang, H., Cohen-Or, D., Wolf, L., and Hamarneh, G. 2011. Prior knowledge for part correspondence. CGF (Proc. Eurographics) 30, 2, 553--562.*
Kalogerakis, Evangelos, et al, "Learning 3D Mesh Segmentation and Labeling," ACM Transactions on Graphics (TOG), vol. 29, Issue 4, Jul. 2010, Article 102, 13 pages.
(Continued)

*Primary Examiner* — Jiangeng Sun
(74) *Attorney, Agent, or Firm* — Kilpatrick Townsend & Stockton LLP

(57) ABSTRACT

This disclosure involves generating and outputting a segmentation model using 3D models having user-provided labels and scene graphs. For example, a system uses a neural network learned from the user-provided labels to transform feature vectors, which represent component shapes of the 3D models, into transformed feature vectors identifying points in a feature space. The system identifies component-shape groups from clusters of the points in the feature space. The system determines, from the scene graphs, parent-child relationships for the component-shape groups. The system generates a segmentation hierarchy with nodes corresponding to the component-shape groups and links corresponding to the parent-child relationships. The system trains a point classifier to assign feature points, which are sampled from an input 3D shape, to nodes of the segmentation hierarchy, and thereby segment the input 3D shape into component shapes.

17 Claims, 11 Drawing Sheets

(56) References Cited

OTHER PUBLICATIONS

Jain, Arjun, et al, "Exploring Shape Variations by 3D-Model Decomposition and Part-based Recombination," Computer Graphics Forum, vol. 31, No. 2, Pt 3, Blackwell Publishing Ltd, May 2012, 10 pages.
Jain, Arjun, et al, "Material Memex: Automatic Material Suggestions for 3D Objects," ACM Transactions on Graphics (TOG), vol. 31, Issue 6, Article No. 143, Nov. 2012, 8 pages.
Kalogerakis, Evangelos, et al, "A Probabilistic Model for Component-Based Shape Synthesis," ACM Transactions on Graphics (TOG) vol. 31, Issue 4, Article 55, Jul. 2012, 13 pages.
Li, Yi, et al, "Fully Convolutional Instance-Aware Semantic Segmentation," arXiv preprint arXiv:1611.07709, Nov. 23, 2016, 9 pages.
Izadinia, Hamid, et al, "Deep Classifiers from Image Tags in the Wild," ACM, MMCommons '15 Proceedings of 2015 Workshop on Community-Organized Multimodal Mining: Opportunities for Novel Solutions, Oct. 2015, 6 pages.
Yl, Li, et al, "A Scalable Active Framework for Region Annotation in 3D Shape Collections," ACM Transactions on Graphics (TOG)—Proceedings of ACM Siggraph Asia , vol. 35, Issue 6, Article 210, Nov. 2016, 12 pages.

* cited by examiner

SEGMENTING THREE-DIMENSIONAL SHAPES INTO LABELED COMPONENT SHAPES

TECHNICAL FIELD

This disclosure relates generally to segmenting and labeling three-dimensional ("3D") models. More specifically, but not by way of limitation, this disclosure relates to training machine-learning algorithms to hierarchically segment 3D shapes into labeled component shapes.

BACKGROUND

Certain graphical applications are used for segmenting and labeling 3D models. Segmenting a 3D model involves identifying component shapes that, when combined, form the 3D model. In one example, segmenting a 3D model of a car involves decomposing the 3D model into component shapes such as a body, wheels, a windshield, a roof, a trunk, etc. Labelling the 3D model involves applying a label or other identifier to component shapes (e.g., labeling a first component shape as a "body," a second component shape as a "hood," etc.).

Some existing solutions for segmenting 3D models involve training segmentation algorithms in a highly supervised manner. For instance, to accurately train these segmentation algorithms, a user manually generates pre-labeled training data for training segmentation algorithms before newly encountered 3D models are segmented using the segmentation algorithms. The user is required to identify different examples of component shapes for a 3D model. Furthermore, the user must consistently apply the same labeling to similar types of component shapes in different 3D models. Thus, generating this pre-labeled training data involves extensive manual effort.

Certain publicly available data on different 3D models includes labeling information for the 3D models. For example, a public website may allow different artists (e.g., hobbyists, videogame designers, etc.) to independently contribute various 3D models. Each artist applies a subjective labelling scheme that is specific to the artists' needs, preferences, or workflows. These subjective labels are not applied for the purpose of enabling segmentation of newly encountered shapes. Thus, this publicly available 3D model data lacks a consistent labeling scheme required for training certain existing segmentation algorithms.

Other existing solutions involve segmentation algorithms that automatically assign component shapes of a 3D model without requiring pre-labeled training data. But, because these segmentation algorithms do not assign user-provided labels to component shapes, the resulting labels lack any semantic meaning. For instance, applying these segmentation algorithms to a 3D model of a car would result in certain component shapes being assigned labels such as "cluster 1" and "cluster 2," which do not convey that a particular component shape is a hood, a trunk, a wheel, a window, etc.

SUMMARY

Certain embodiments involve hierarchically segmenting three-dimensional ("3D") shapes into labeled component shapes. For example, a computing system generates and outputs a segmentation model using training data, where the training data includes 3D models having user-provided labels and scene graphs. The computing system uses a neural network, which is learned from the user-provided labels to transform feature vectors, which represent component shapes of the 3D models, into transformed feature vectors. The transformed feature vectors identify points in a multi-dimensional feature space. The computing system identifies component-shape groups from clusters of the points in the feature space. Each component-shape group includes a subset of the component shapes from the training data and is associated with a label obtained from the user-provided labels. The computing system determines, from the user-provided scene graphs, parent-child relationships for the component-shape groups. To classify different types of component shapes, the computing system generates a segmentation hierarchy with nodes corresponding to the component-shape groups and links corresponding to the parent-child relationships. The computing system also trains a point classifier to assign feature points, which are sampled from an input 3D shape, to nodes of the segmentation hierarchy, and thereby segment the input 3D shape into component shapes. The computing system outputs the segmentation model with the segmentation hierarchy and the trained classifier, where the segmentation model can be used to segment input 3D shapes that lack one or more of segmentation data, hierarchical data, labeling data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
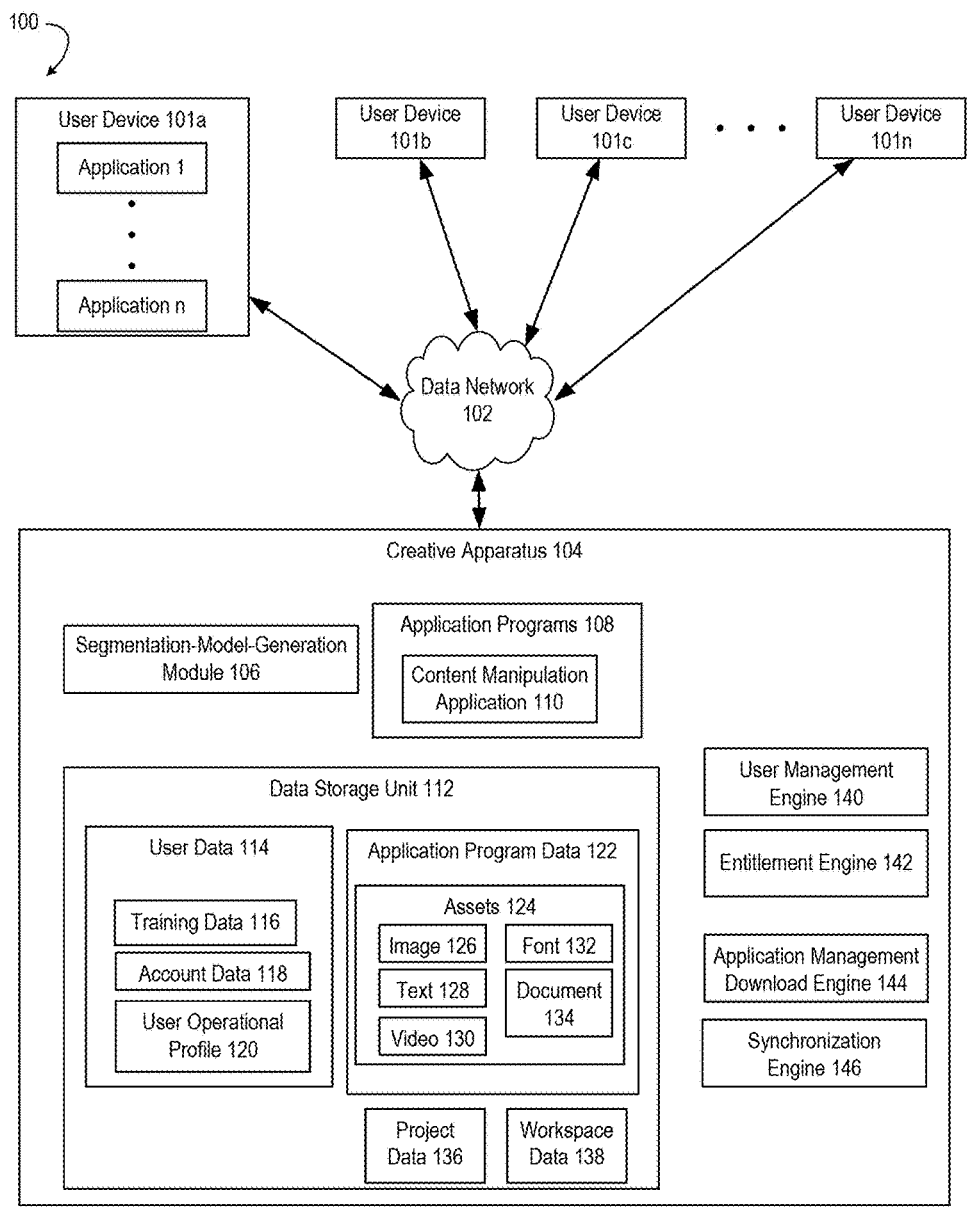
FIG. 1 depicts an example of a network environment for hierarchically segmenting three-dimensional (3D) shapes into labeled component shapes, according to certain embodiments of the present disclosure.

The present disclosure includes systems and methods for hierarchically segmenting 3D shapes into labeled component shapes. As explained above, conventional solutions are unable to accurately train algorithms for hierarchically segmenting 3D shapes in a semantically meaningful way. Certain embodiments described herein can more effectively segment 3D models or other 3D shapes by training a segmentation model to automatically label a component shape of a larger 3D shape with a semantically meaningful label and to accurately assign the component shape to a position in a hierarchy. For instance, some embodiments involve transforming a set of training data, which includes user-provided 3D models having at least component shapes that are tagged with user-provided labels and user-provided scene graphs describing parent-child relationships among component shapes, into a standardized training dataset. As described in detail herein, a segmentation hierarchy is generated from the standardized training dataset. Furthermore, the standardized training dataset and the segmentation hierarchy are used to train a classifier algorithm to recognize features of 3D shapes and thereby assign the 3D shapes to an appropriate position in the segmentation hierarchy.

The following non-limiting example is provided to introduce certain embodiments. In this example, a segmentation system accesses training data that includes comprising 3D models. For instance, the segmentation system may retrieve a set of training data from a publicly available, online repository of 3D models of vehicles. Users of the online repository (e.g., videogame designers, artists, etc.) provide various 3D models having at least some user-provided labels (e.g., "car," "wheel," "tire," etc.) and at least some user-provided hierarchical data (e.g., scene graphs specifying that a "wheel" shape is a child of a "car" shape and a parent of a "tire" shape). The segmentation system learns a suitable function (e.g., a transformation via a neural network) for transforming vector-based representations of these retrieved 3D models into a common feature space (i.e., a logical n-dimensional space in which the values of different vector dimensions represent various geometric features of component shapes). The transformation into a common feature space allows feature vectors corresponding to geometrically similar shapes to be clustered together for labeling. For instance, although the training data retrieved from online repository may include various different types of vehicles without any consistent labeling scheme, the segmentation system identifies feature vectors representing the various component shapes. The segmentation system uses at least some of the user-provided labels to learn a transformation between these initial feature vectors and transformed feature vectors, which occupy the common feature space. In this manner, the segmentation system generates, in the common feature space, vector-based representations of various component shapes (e.g., wheel shapes, bumper shapes, etc.) from the user-provided 3D models, where similar component shapes are represented by transformed feature vectors that are closer together in the common feature space (and vice versa).

Continuing with this example, the transformed training data (e.g., the transformed feature vectors) enables the segmentation system to identify component-shape groups and to build a hierarchy of group parent-child relationships for the component-shape groups. For instance, the segmentation system identifies clusters of points in the feature space that are defined by the transformed feature vectors (e.g., a cluster of points representing different wheel shapes from different models, a cluster of points representing different car body shapes from different models, etc.) A cluster of points represents a group of component shapes (e.g., a "wheel" group, a "body" group, etc.). The segmentation system iteratively modifies these clusters (and their associated component-shape groups) based on hierarchical information included in the user-provided scene graphs.

For example, an initial clustering operation may result in a group that includes both a "wheel" shape and a "tire" shape. The segmentation system determines, from an analysis of one or more user-provided scene graphs, that a "wheel" is a parent shape of a "tire," and therefore that the component-shape groups indicated by the initial clustering operation are inconsistent with available hierarchical information (e.g., the set of parent-child relationships among car parts). Consequently, the segmentation system updates the clusters so that the cluster memberships are consistent with the available hierarchical information. This iterative process results in a set of clusters, which represent various component-shape groups, and an associated set of group parent-child relationships among the clusters. The segmentation system generates a segmentation hierarchy based on the component-shape groups and group parent-child relationships determined from the iterative process.

Continuing with this example, the segmentation system uses the segmentation hierarchy and the training data to train a point classifier. The point classifier associates features of certain points on a 3D shape (e.g., features indicative of a wheel) with a certain node of a segmentation hierarchy (e.g., a node corresponding to a "wheel" group identified through the iterative process described above). Training the point classifier involves, for example, sampling certain points from component shapes in the training data, identifying features of those points, and learning a correspondence between the identified features and a corresponding node of the segmentation hierarchy. The trained point classifier is therefore capable of recognizing a correspondence between an input feature point sampled from an input 3D shape and a node of the segmentation hierarchy, and thereby classifying such a feature point as belonging to a certain group in the segmentation hierarchy. The portion of the input 3D shape from which the feature points were sampled can therefore be labeled based on the classification provided by the point classifier.

As used herein, the term "3D model" is used to refer to a digital representation of a 3D object, a 3D surface, or some combination thereof. A 3D model includes a collection of points in a 3D space. Various points in the 3D space are connected via triangles, lines, curves, etc. to define specific 3D surfaces, specific 3D objects, or both. 3D models can be generated using any suitable process (e.g., through a scanning process, through a manual process using a graphical application, etc.).

As used herein, the term "component shape" is used to refer to a shape or set of shapes in a 3D model that, when combined with other component shapes, form the 3D model or an object in the 3D model. For example, a 3D model of a car may include component shapes such as "wheel" shapes, "hood" shapes, "window" shapes, etc. Certain component shapes may have parent-child relationships with other component shapes.

As used herein, the term "parent-child relationship" is used to refer to a first component shape being a sub-component of another component shape. For example, a "car" component shape may be composed of "wheel" component shapes, a "body" component shape," and a "window" component shape. Thus, the "car" component shape is a parent of the "wheel" component shapes, a "body" component shape," and a "window" component shape. Similarly, a "wheel" component shape may be composed of (and therefore have a parent relationship to) a "tire" component shape and a "rim" component shape. In some embodiments, identifying parent-child relationships from training data facilitates hierarchical segmentation of newly encountered 3D shapes.

As used herein, the term "hierarchical segmentation" of a three-dimensional shape is used to refer to identifying various subsets of component shapes that are combined to form the three-dimensional shape. In one example, the highest level of a hierarchy is the three-dimensional shape, the lowest level of the hierarchy includes each individual component shape into which the three-dimensional shape can be divided, and intermediate levels of the hierarchy include groups of the component shapes. A higher level of the hierarchy has subsets of component shapes that are larger (i.e., having more component shapes in a given subset) as compared to the subsets of component shapes in a lower level of the hierarchy.

As used herein, the term "segmentation model" is used to refer to a model that is usable by a content manipulation application (e.g., an image-editing application, a graphics-editing application, etc.) to hierarchically segment a 3D shape into component shapes having semantically meaningful labels. In some embodiments, a segmentation model includes a segmentation hierarchy. The segmentation hierarchy includes nodes, which respectively correspond to component-shape groups, and links among the nodes, which respectively correspond to group parent-child relationships among the component-shape groups.

As used herein, the term "component-shape group" is used to refer to a set of component shapes that are identified as having similar geometric features and similar parent-child relationships to other component shapes. For example, a set of "tire" component shapes may be identified as a particular component-shape group based on the set of component shapes having features of a tire (e.g., geometric, surface texture, etc.) and a child relationship to other component shapes identified as wheels. As described in detail herein, at least some component-shape groups are associated with user-provided labels or derived labels that are generated based on user-provided labels.

As used herein, the term "user-provided label" is used to refer to metadata included in (or otherwise associated with) a 3D model that tags or otherwise identifies a particular component shape in the 3D model. For instance, a user-provided label may identify components of a 3D model as "wheels," "body," and "window," respectively. In some embodiments, user-provided labels are obtained from publicly accessible repositories of 3D models. These user-provided labels are provided by individual artists or other users without a consistent labeling scheme.

As used herein, the term "group parent-child relationship" is used to refer to parent-child relationships among component-shape groups that are identified and, in some cases, refined based on both the membership of certain component shapes in a component-shape group and hierarchical information from user-provided scene graph data. For example, a first component-shape group (e.g. a "wheel") may include a certain percentage of component shapes that are identified, in user-provided scene graphs, as children of component shapes that belong to a second component-shape group. In this example, the first component-shape group is identified as a child of the second component-shape group based on the percentage of component shapes in the first component-shape group being identified as children of component shapes in the second component-shape group.

As used herein, the term "user-provided scene graph" is used to refer to a data structure that identifies logical and spatial relationships among at least some of the component shapes in a 3D model. In one example, a scene graph is a set of nodes in a graph or tree structure, where links between the nodes identify parent-child relationships among component shapes. In some embodiments, user-provided scene graphs are obtained from publicly accessible repositories of 3D models. These user-provided scene graphs are provided by individual artists or other users without a consistent scheme from 3D model to 3D model. For example, a first 3D model of a car provided by a first user may include a scene graph identifying a parent "car" shape, a "body" shape that is a child of the "car" shape, and "wheel" shapes that are children of the "body" shape. But a second 3D model of a car provided by a second user may include a different scene graph that only identifies a parent "car" shape and "wheel" shapes that are children of the "car" shape, without an intermediate "body" shape that is a child of the "car" shape and a parent of the "wheel" shapes.

As used herein, the term "feature vector" is used to refer to a vector that numerically encodes one or more features of a component shape of a 3D model or other 3D shape or one or more features of a point sample from a 3D shape. For example, a first feature vector may have a set of values representing a first geometric shape and a second feature vector may have a set of values representing a second geometric shape. Feature vectors that are closer together in a feature space represent geometric shapes that are more similar to one another. Feature vectors that are further from one another in the feature space represent geometric shapes that are more dissimilar.

As used herein, the term "feature space" is used to refer to a multidimensional vector space corresponding to a set of feature vectors. For example, a set of feature vectors, each of which has n dimensions, define a set of points in an n-dimensional feature space.

As used herein, the term "feature point" is used to refer to a point sampled from a surface of a 3D component shape for the purpose of training a classifier algorithm. For instance, if a 3D model includes a collection of points, a subset of those points may be sampled or otherwise selected for the purpose of matching certain geometric features in a newly encountered 3D shape to one or more corresponding nodes in a segmentation hierarchy.

Example of an Operating Environment for Generating a Segmentation Model

Referring now to the drawings, FIG. 1 depicts an example of a network environment 100 for hierarchically segmenting 3D shapes into labeled component shapes, according to certain embodiments of the present disclosure. In the example depicted in FIG. 1, various user devices 101a-n access a creative apparatus 104 via a data network 102. The creative apparatus 104 executes one or more segmentation-model-generation modules 106 (or other suitable program code) for performing one or more functions used in generating a segmentation model using training data 116.

Figure 2:
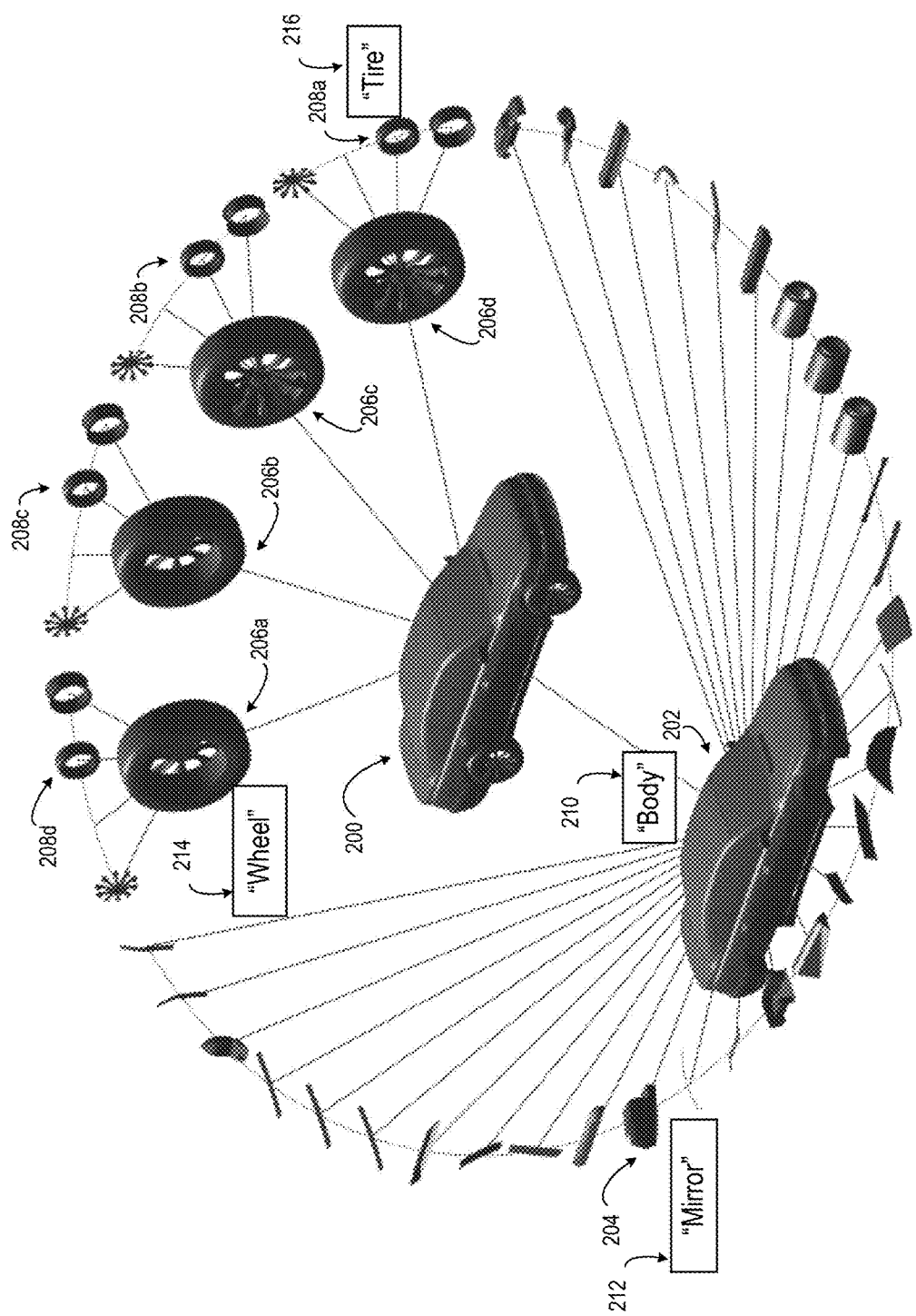
FIG. 2 depicts an example of a segmented and labeled 3D model, according to certain embodiments of the present disclosure.

A segmentation model can be used for segmenting and labeling 3D shapes, components of 3D models, or some combination thereof in one or more applications or services that are available via the creative apparatus 104 (e.g., a content manipulation application 110). FIG. 2 depicts an example of a segmented and labeled 3D model, according to certain embodiments of the present disclosure. In this example, a 3D model 200 of a car is depicted.

In some embodiments, segmenting a 3D shape involves identifying one or more component shapes (or groups of component shapes) that are combined to form the 3D shape. For example, the 3D model 200 of a car includes different component shapes that are arranged to provide the 3D model 200. The exploded view of the 3D model 200, as depicted in FIG. 2, depicts some of these component shapes, such as the body component shape 202, the mirror component shape 204, the wheel component shapes 206a-d, the tire component shapes 208a-d, etc. Some or all of the identified component shapes can be labeled. For instance, the 3D model 200 depicted in FIG. 2 includes a label 210 identifying the body component shape 202, a label 212 identifying the mirror component shape 204, a label 214 identifying the wheel component shapes 206a, and a label 216 identifying the tire component shapes 208a.

Generating a segmentation model includes projecting feature vectors representing component shapes of training 3D models into a common feature space, identifying groups of component shapes by clustering the projected feature vectors in the common feature space, learning hierarchical relationships among these component-shape groups, and training a point classifier to associate features of certain points on a 3D shape (e.g., an unlabeled 3D model, a 3D model without hierarchical information, etc.) with certain groups at certain positions in a segmentation hierarchy. Examples of these operations are described in further detail with respect to FIGS. 2-13.

Returning to FIG. 1, some embodiments of the network environment 100 includes user devices 101a-n. Examples of a user device include, but are not limited to, a personal computer, tablet computer, a desktop computer, a processing unit, any combination of these devices, or any other suitable device having one or more processors. Each user device includes at least one application supported by the creative apparatus 104. User devices 101a-n correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include tools such as the content manipulation application 110 that are used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Each of the user devices 101a-n is communicatively coupled to the creative apparatus 104 via the data network 102. A user of a user device can use various products, applications, or services supported by the creative apparatus 104 via the data network 102. Examples of the data network 102 include, but are not limited to, internet, local area network ("LAN"), wireless area network, wired area network, wide area network, and the like.

The creative apparatus 104 includes one or more engines for providing one or more digital experiences to the user. In some embodiments, these engines include one or more of the engines depicted in FIG. 1. In other embodiments, one or more of the engines depicted in FIG. 1 may be omitted from a creative apparatus 104.

The creative apparatus 104 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 104 also includes a data storage unit 112. The data storage unit 112 can be implemented as one or more databases or one or more data servers. The data storage unit 112 includes data that is used by the segmentation-model-generation module 106 and other engines of the creative apparatus 104.

The user uses one or more application programs 108, which can include the content manipulation application 110, to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are stored as application program data 122 in the data storage unit 112 by a synchronization engine 146. The application program data 122 can be specific to the user or can be shared with other users based on rights management.

In some embodiments, the application program data 122 includes one or more assets 124. The assets 124 may include shared assets that the user wants to share with other users or that the user wants to offer on a marketplace. The assets 124 can also be shared across multiple application programs 108. In some embodiments, each asset includes metadata.

In some embodiments, each asset also includes a file. Examples of the file include, but are not limited to, an image 126, text 128, a video 130, a font 132, a document 134, a combination of any of these, and the like. In another embodiment, an asset only includes the metadata. The application program data 122 also includes project data 136 and workspace data 138. In some embodiments, the project data 136 includes copies of the assets 124 or the assets 124 themselves. In additional or alternative embodiments, the assets 124 are standalone assets. Similarly, the workspace data 138 can be part of the project data 136 in some embodiments and may be standalone data in other embodiments.

In some embodiments, the user can have one or more user devices (e.g., user devices 101a-n). The application program data 122 is accessible by the user from any device (e.g., device 101b), including a device that was not used to create the assets 124 (e.g., device 101c). This is achieved by the synchronization engine 146 that stores the application program data 122 in the data storage unit 112 and makes the application program data 122 available for access by the user or other users via any device. Before accessing the application program data 122 by the user from any other device or by any other user, the user or the other user may need to provide login details for authentication if not already logged in. Otherwise, if the user or the other user is logged in then a newly created asset or updates to the application program data 122 are provided in real time. The workspace data 138 enables the synchronization engine 146 to provide same workspace configuration to the user on any other device or to the other user based on rights management data.

In some embodiments, a user of one or more of the user devices 101a-n visits a webpage or an application store to explore applications supported by the creative apparatus 104 (e.g., the content manipulation application 110). The creative apparatus 104 provides the applications (e.g., the content manipulation application 110) as a software as a service ("SaaS"), or as a standalone application that can be installed on the user device 101, or as a combination.

In some embodiments, the user creates an account with the creative apparatus 104 by providing user details and by creating login details. Alternatively, the creative apparatus 104 can automatically create login details for the user in response to receipt of the user details. In some embodiments, the user is also prompted to install an application manager. The application manager enables the user to manage installation of various applications supported by the creative apparatus 104 and to manage other functionalities, such as updates, subscription account and the like, associated with the applications. The user details are received by a user management engine 140 and stored as user data 114 in the data storage unit 112. In some embodiments, the user data 114 further includes account data 118 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 120 is generated by an entitlement engine 142. The user operational profile 120 is stored in the data storage unit 112 and indicates entitlement of the user to various products or services. In some embodiments, the user operational profile 120 also indicates type of user, i.e. free, trial, student, discounted, or paid. In some embodiments, the user management engine 140 and the entitlement engine 142 can be one single engine performing the functionalities of both the engines.

In some embodiments, the user installs various applications supported by the creative apparatus 104 via an application download management engine 144. Application installers or application programs 108 (which may include the content manipulation application 110 or other software usable to perform operations described herein) are present in the data storage unit 112 and are fetched by the application download management engine 144. These applications are made available to the user directly or via the application manager. In some embodiments, all application programs 108 are fetched and provided to the user via an interface of the application management download engine 144. In other embodiments, application programs 108 for which the user is eligible based on user's operational profile are displayed to the user. The user selects the application programs 108 that the user wants to download. The application programs 108 are downloaded on one or more of the user devices 101a-n by the application manager via the application download management engine 144. Corresponding data regarding the download is also updated in the user operational profile 120. An application program 146 is an example of a digital tool. The application download management engine 144 also manages a process of providing updates to the user device 101.

In some embodiments, upon download, installation, and launching of an application program, the user is asked to provide the login details. A check is again made by the user management engine 140 and the entitlement engine 142 to ensure that the user is entitled to use the application program. In other embodiments, direct access is provided to the application program as the user is already logged into the application manager.

Examples of Operations for Providing a Segmentation Model

As described in detail with respect to the various examples below, the segmentation-model-generation module 106 is used to develop and use a segmentation model according to various embodiments. For instance, a segmentation model is trained, optimized, generated, or otherwise modified by the segmentation-model-generation module 106. The segmentation model is used to segment a 3D shape, which can include identifying component shapes included in the 3D model.

Figure 3:
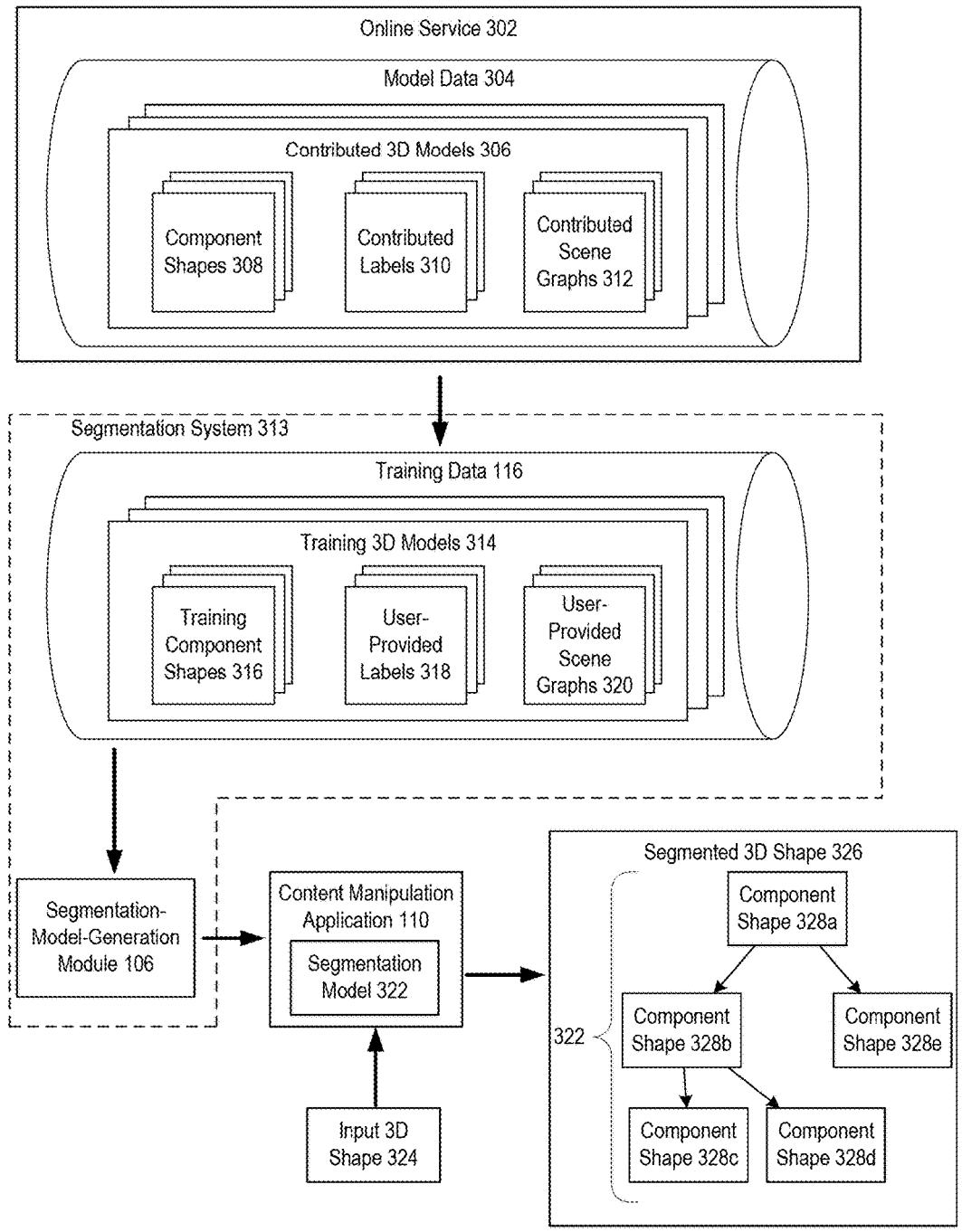
FIG. 3 depicts an example of a communications flow for generating and applying a segmentation model that hierarchically segments input 3D shapes into labeled component shapes, according to certain embodiments of the present disclosure.

FIG. 3 depicts an example of a communications flow for generating and applying a segmentation model that hierarchically segments input 3D shapes into labeled component shapes, according to certain embodiments of the present disclosure. In this example, the segmentation-model-generation module 106 (or other suitable program code) is executed to obtain at least some training data 116 from an online service 302. In some embodiments, the online service 302 is independent of the segmentation-model-generation module 106, the content manipulation application 110, or any other application hosted or provided by the creative apparatus 104 depicted in FIG. 1. For instance, the online service 302 may include (or be accessible from) a publicly accessible website, a subscription based website, or some other online access portal that is not accessible via the creative apparatus 104 or another system associated with the creative apparatus 104.

In this example, the online service 302 hosts a large set of model data 304. The model data 304 includes contributed 3D models 306 that are provided by users of the online service 302. For example, different artists (e.g., hobbyists, videogame designers, etc.) may independently upload, transmit, or otherwise provide various 3D models to the model data 304. Each contributed 3D model 306 includes a respective set of component shapes 308. A given set of component shapes 308 is combined in a certain arrangement to provide a particular contributed model 306.

At least some of the contributed 3D models 306 have at least some label information (e.g., tags or other identifiers) regarding the contributed 3D models 306. For example, some of the contributed 3D models 306 include (or are otherwise associated with) contributed labels 310. The contributed labels 310 identify certain component shapes (e.g., "wheel," "tire," "body," etc.) in a particular contributed 3D model 306.

At least some of the contributed 3D models 306 have at least some hierarchical information regarding the 3D models. For example, some of the contributed 3D models 306 include (or are otherwise associated with) contributed scene graphs 312. The contributed scene graphs 312 identify certain relationships among component shapes 308 in a particular contributed 3D model 306.

A segmentation system 313 enables the use of a publicly accessible repository, such as the model data 304 that is accessible via an online service 302, for training one or more machine-learning algorithms to hierarchically segment 3D shapes. The segmentation system 313 includes the segmentation-model-generation module 106 and the training data 116. In some embodiments, the segmentation system 313 also includes hardware such as a processing device that executes the segmentation-model-generation module 106 and a non-transitory computer-readable medium and associated data structures that store the training data 116.

In one example, the segmentation system 313 communicates with the online service 302 and thereby selects, as a set of training data 116, some or all of the contributed 3D models 306 as training 3D models 314. The segmentation system 313 also selects some or all of the contributed labels 310 and contributed scene graphs 312 (i.e., the label data and scene graph data for the selected 3D models 306) as user-provided labels 318 and user-provided scene graphs 320 that are included in the training data 116.

In some embodiments, selecting the user-provided labels 318 also involves analyzing a set of user-provided labels retrieved from the online service 302 and choosing a subset of these user-provided labels as a dictionary of user-provided labels 318. In one example, the segmentation-model-generation module 106 selects certain user-provided labels for the dictionary of user-provided labels 318 based on the selected labels matching one or more words in a natural language dictionary. For instance, labels including the words "wheel" and "tire" may be selected based on those words being found in an English-language dictionary. The use of the natural language dictionary allows labels that are semantically meaningful (e.g., that describe some visual characteristic in a manner comprehensible to a human reader) to be selected. Conversely, labels that lack words "wheel" and "tire" found in an English-language dictionary (e.g., alphanumeric string such as "Part 1013") may be excluded from the dictionary of user-provided labels 318. The exclusion of such labels may prevent the user-provided labels 318 from attempting to use labels without semantic meaning to analyze the component shapes of the training data 116.

The segmentation system 313 executes the segmentation-model-generation module 106 to generate, train, or otherwise develop a segmentation model 322 based on the training data 116. The segmentation-model-generation module 106 outputs the segmentation model 322 for use by a content manipulation application 110 (e.g., by transmitting the segmentation model 322 to a computing device that executes the content manipulation application 110, by storing the segmentation model 322 in a non-transitory computer-readable medium accessible the content manipulation application 110, etc.).

The content manipulation application 110 can use the segmentation model 322 to transform an input 3D shape 324 into a segmented 3D shape 326. The input 3D shape 324 can lack one or more of labels, hierarchical information, or other data used for identifying component shapes of the input 3D shape 324, separating the input 3D shape 324 into component shapes, or both. By applying the segmentation model 322, the content manipulation application 110 can identify component shapes 328a-e of the input shape. The content manipulation application 110 can arrange component shapes 328a-e into a hierarchy 330. In some embodiments, the hierarchy 330 (or other data generated from the segmentation model 322) includes labels for the component shapes 328a-e. The hierarchy 330 also includes data identifying parent-child relationships among the component shapes 328a-e (e.g., component shapes 328b and 328e being child component shapes with respect to component shape 328a, component shapes 328c and 328d being child component shapes with respect to component shape 328b, etc.).

Figure 4:
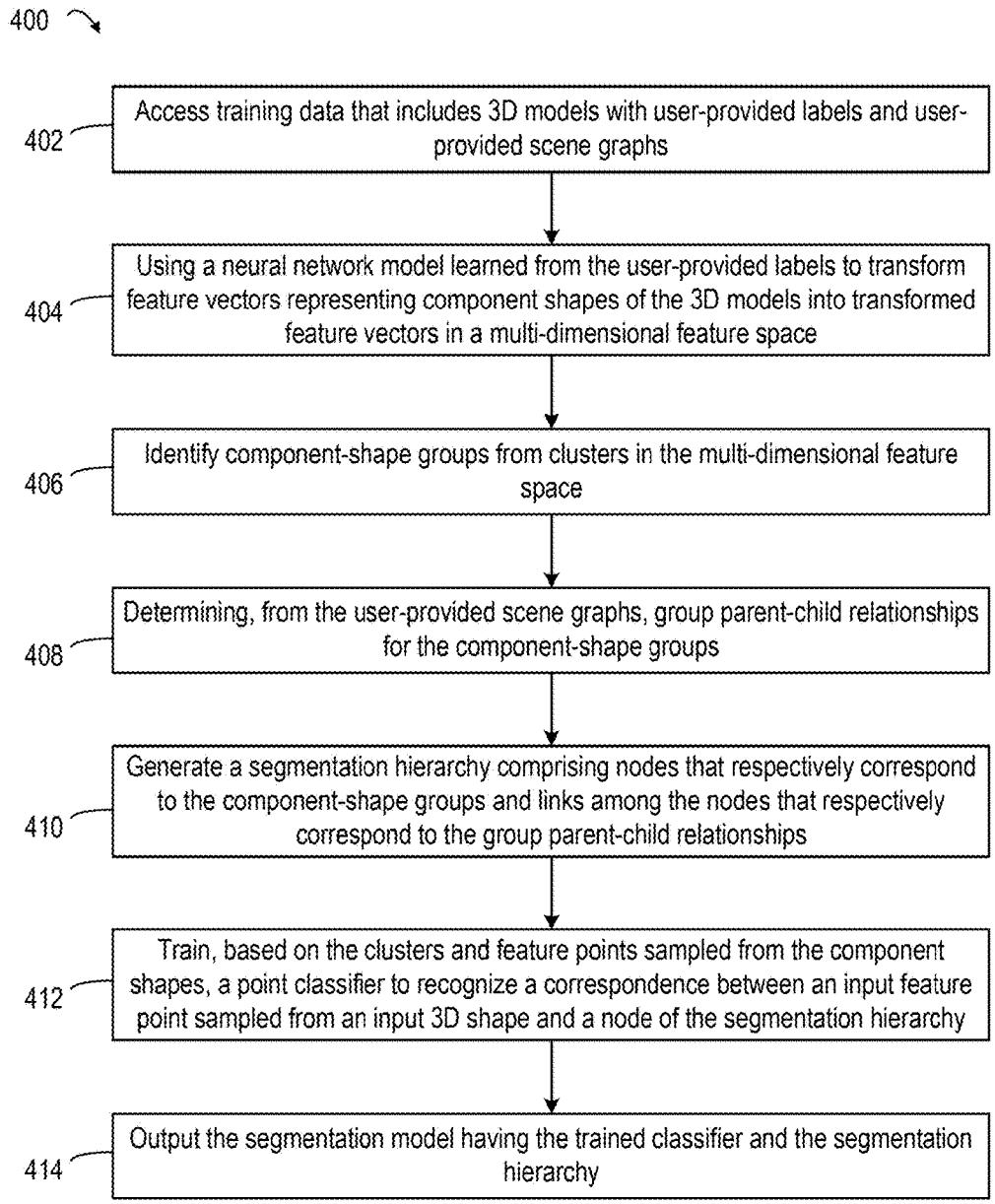
FIG. 4 depicts an example of a process for generating a segmentation model that hierarchically segments 3D shapes into labeled component shapes, according to certain embodiments of the present disclosure.

The segmentation model 322 can be generated using one or more operations described herein. For instance, FIG. 4 depicts an example of a process 400, which may be performed by the creative apparatus 104 or another suitable computing system, for generating a segmentation model that hierarchically segments 3D shapes into labeled component shapes, according to certain embodiments of the present disclosure. In some embodiments, one or more processing devices implement operations depicted in FIG. 4 by executing suitable program code (e.g., the segmentation-model-generation module 106). For illustrative purposes, the process 400 is described with reference to certain examples depicted in the figures. Other implementations, however, are possible.

At block 402, the process 400 involves accessing training data that includes 3D models with user-provided labels and user-provided scene graphs. In some embodiments, as described above with respect to FIG. 3, the set of training data 116 includes multiple training 3D models 314 that have been retrieved or otherwise selected from a publicly available data source (e.g., the model data 304 provided by an online service 302). At least some of the training 3D models include groups of component shapes, where the component shapes are respectively tagged with user-provided labels 318. At least some of the training 3D models have model parent-child relationships (i.e., user-provided parent-child relationships) described by user-provided scene graphs 320.

A processing device executes one or more segmentation-model-generation modules 106 (or suitable other program code) to implement block 402. For example, the program code for the segmentation-model-generation module 106, which is stored in a non-transitory computer-readable medium, is executed by one or more processing devices. Executing the segmentation-model-generation module 106 causes the processing device to access the training data 116 that is stored in the same non-transitory computer-readable medium or a different non-transitory computer-readable medium. In some embodiments, accessing the training data involves communicating, via a data bus, suitable signals between a local non-transitory computer-readable medium and the processing device. In additional or alternative embodiments, accessing the training data involves communicating, via a data network, suitable signals between a computing system that includes the non-transitory computer-readable medium and a computing system that includes the processing device.

At block 404, the process 400 involves using a neural network model learned from the user-provided labels to transform feature vectors representing component shapes of the 3D models into transformed feature vectors in a multi-dimensional feature space. For example, a given component shape has multiple features (e.g., geometry, special configuration, scale, context features, etc.) that can be represented numerically in a vector. The neural network (e.g., a Siamese neural network) receives these feature vectors for different component shapes, as well as user-provided labels for the different component shapes. The transforms the feature vectors such that transformed feature vectors corresponding to similar component shapes (e.g., component shapes with the same or similar user-provided labels) are spaced closer together and transformed feature vectors corresponding to different component shapes (e.g., component shapes with dissimilar user-provided labels) are spaced further apart.

For instance, in some embodiments, the segmentation-model-generation module 106 generates, accesses, or otherwise obtains initial feature vectors for the component shapes in the training data. Differences in similar component shapes across different training 3D models (e.g., two different "wheel" shapes in two different "car" 3D models) may cause these initial feature vectors to be different from one another (e.g., by having different numbers of dimensions, different dimension values, etc.). The segmentation-model-generation module 106 standardizes these initial vectors by transforming the initial feature vectors into transformed feature vectors, where each transformed feature vector has the same number of dimension for a multi-dimensional feature space.

In some embodiments, the segmentation-model-generation module 106 accesses or builds a neural network model (e.g., a Siamese neural network) for transforming the feature vectors. For instance, the segmentation-model-generation module 106 iteratively adjusts the neural network so that two initial feature vectors corresponding to certain component shapes labeled as a "wheel" are transformed, via the neural network, into n-dimensional transformed feature vectors that are close to one another in an n-dimensional feature space. Examples of using and training a neural network to transform feature vectors are described in detail with respect to FIGS. 5-8.

A processing device executes one or more segmentation-model-generation modules 106 or other program code to implement block 404. In one example, the program code for the segmentation-model-generation module 106, which is stored in a non-transitory computer-readable medium, is executed by one or more processing devices. Executing the segmentation-model-generation module 106 causes the processing device to access, generate, or otherwise obtain a set of initial representation vectors for component shapes (e.g., at least some of the training component shapes 316 depicted in FIG. 3) that are stored in the non-transitory computer-readable medium or a different non-transitory computer-readable medium. In some embodiments, obtaining the initial feature vectors involves communicating, via a data bus, suitable signals between a local non-transitory computer-readable medium and the processing device. In additional or alternative embodiments, accessing the initial feature vectors involves communicating, via a data network, suitable signals between a computing system that includes the non-transitory computer-readable medium and a computing system that includes the processing device. The segmentation-model-generation module 106 executes one or more operations, examples of which are described further with respect to FIGS. 5-8, to train a neural network for transforming initial feature vectors into transformed feature vectors. The segmentation-model-generation module 106 causes one or more processing devices to the transformed feature vectors in a non-transitory computer-readable medium for use by the process 400.

At block 406, the process 400 involves identifying component-shape groups from clusters in the multi-dimensional feature space. For example, each transformed feature vector generated at block 404 defines a point in the multi-dimensional feature space. The segmentation-model-generation module 106 uses the clustering of points in the feature space (at least in part) to identify component-shape groups. For instance, a set of points that is close together (i.e., a cluster) corresponds to a set of component shapes having similar features (e.g., a set of "wheel" shapes from different "car" 3D models). In some embodiments, initial component-shape groups are identified based on clusters and then iteratively adjusted to obtain finalized component-shape groups at block 406.

A given component-shape group (e.g., a group identified through an iterative process involving clusters in the feature space) includes a respective subset of the component shapes from the training 3D models. The segmentation-model-generation module 106 associates this component-shape group with a label that is obtained the user-provided labels. Applying a label to a component-shape group can associate a label to component shapes 316 that lacked labels when selected from the model data 304. In one example, one or more of the user-provided labels 318 is selected and applied to a component-shape group that includes one or more component shapes having these labels. For instance, if one or more training component shapes 316 are associated with a "wheel" label and a component-shape group is identified that includes these component shapes 316, the label "wheel" is applied to the component-shape group. In another example, one or more of the user-provided labels 318 is selected, a new label is derived from one or more selected labels 318, and the derived label is applied to a component-shape group that includes one or more component shapes originally having one or more selected labels 318. For instance, a component-shape group may be identified that includes component shapes 316 that were labeled as "back window" and "windshield" when selected from the model data 304. The segmentation-model-generation module 106 can derive a "window" label from the "back window" and "windshield" labels. The segmentation-model-generation module 106 can re-label the component shapes in the component-shape group with the derived "window" label.

A processing device executes the segmentation-model-generation module 106 or other program code to implement block 406. For example, the program code for the segmentation-model-generation module 106, which is stored in a non-transitory computer-readable medium, is executed by one or more processing devices. In some embodiments, executing the program code causes a computing system to perform one or more operations that determine or otherwise identify the component-shape groups of block 406. Examples of operations for determining or otherwise identifying component-shape groups are described herein with respect to FIGS. 9-12.

In some embodiments, the segmentation-model-generation module 106 uses the clustering operations performed in block 406 to apply semantically meaningful labels to un-labeled component shapes. In one example, a first feature vector corresponds to a component shape with a "tire" label, and a second feature vector corresponds to a component shape without a label or with a label such as "Part 1234" that conveys little or no useful semantic meaningful information. The segmentation-model-generation module 106 transforms the first and second feature vectors into first and second transformed feature vectors, respectively, as described above with respect to block 404. The segmentation-model-generation module 106 determines, at block 406, that the points defined by the first and second transformed feature vectors are in the same cluster within the feature space 702. The segmentation-model-generation module 106 therefore determines that the corresponding first and second component shapes belong to the same component-shape group. The segmentation-model-generation module 106 applies a label for the component-shape group (e.g. "tire") to the un-labeled component shape.

The segmentation-model-generation module 106 uses the component-shape groups identified from the clusters to train one or more segmentation algorithms for the segmentation model. Examples of operations for training a segmentation algorithm include one or more of the operations described with respect to blocks 408, 410, and 412.

At block 408, the process 400 involves determining, from the user-provided scene graphs, group parent-child relationships for the component-shape groups. A group parent-child relationship identifies a hierarchical relationship among at least two component-shape groups. For example, a group parent-child relationship between a first component-shape group and a second component-shape group may indicate that the first component-shape group is a parent of the second component-shape group, or vice versa. In some embodiments, the segmentation-model-generation module 106 analyzes data from user-provided scene graphs 320 to determine the group parent-child relationships. For example, the segmentation-model-generation module 106 may identify a group parent-child relationship between a first component-shape group and a second component-shape group based on a certain number of component shapes (or percentage of component shapes) in the first component-shape group being identified, in the user-provided scene graphs 320, as parents of component shapes in the second component-shape group, or vice versa.

In some embodiments, the segmentation-model-generation module 106 iteratively identifies and adjusts the group parent-child relationships to determine, at block 408, finalized group parent-child relationships. Examples of iteratively determining group parent-child relationships are described herein with respect to FIGS. 9-12.

A processing device executes the segmentation-model-generation module 106 or other program code to implement block 408. For example, the program code for the segmentation-model-generation module 106, which is stored in a non-transitory computer-readable medium, is executed by one or more processing devices. In some embodiments, executing the program code causes a computing system to perform one or more operations that determine or otherwise identify the group parent-child relationships of block 408. Examples of operations for determining or otherwise identifying group parent-child relationships are described herein with respect to FIGS. 9-12.

At block 410, the process 400 involves generating a segmentation hierarchy comprising nodes that respectively correspond to the component-shape groups and links among the nodes that respectively correspond to the group parent-child relationships. In one example, a segmentation hierarchy for "car" 3D models includes nodes representing a "body," a "wheel," a "tire," etc. Links between these nodes indicate that a "wheel" node is a child of a "body" node and that a "tire" node is a child of a "wheel" node.

A processing device executes the segmentation-model-generation module 106 or other program code to implement block 410. For example, the program code for the segmentation-model-generation module 106, which is stored in a non-transitory computer-readable medium, is executed by one or more processing devices. In some embodiments, executing the program code causes a computing system to perform one or more operations that generate the segmentation hierarchy of block 410. Examples of operations for generating the segmentation hierarchy of block 410 are described herein with respect to FIGS. 9-12.

At block 412, the process 400 involves training, based on the clusters and feature points that are sampled from the component shapes, a point classifier to recognize a correspondence between an input feature point sampled from an input 3D shape and a node of the segmentation hierarchy. A trained point classifier is capable of sampling a point from a surface of an input 3D shape 324 (i.e., a "feature point"), identifying the features of the sampled point, and classifying the point as belonging to one or more nodes of the segmentation hierarchy.

For instance, continuing with the example of a "car" 3D model from block 410, the point classifier receives an input 3D shape depicting a car, where the input 3D shape lacks labeling data, hierarchical information, or both. The point classifier samples one or more feature points from a surface of the input 3D shape, where the feature points are located on a portion of the input 3D shape depicting a wheel. The point classifier determines, based on the features of the sampled feature points, that the portion of the input 3D shape should be classified as a "wheel" with respect to the segmentation hierarchy described in the example of block 410.

A processing device executes the segmentation-model-generation module 106 or other program code to implement block 412. For example, the program code for the segmentation-model-generation module 106, which is stored in a non-transitory computer-readable medium, is executed by one or more processing devices. In some embodiments, executing the program code causes a computing system to perform one or more operations that train the point classifier. Examples of operations for a training point classifier are described herein with respect to FIG. 13.

At block 414, the process 400 involves outputting the segmentation model having a trained segmentation algorithm (e.g., the trained classifier) and the segmentation hierarchy. A processing device executes the segmentation-model-generation module 106 or other program code to implement block 406. For example, the program code for the segmentation-model-generation module 106, which is stored in a non-transitory computer-readable medium, is executed by one or more processing devices. In some embodiments, executing the program code causes a computing system to output the segmentation model by transmitting the segmentation model from a first computing system, which generates the segmentation model, to a second computing system, which executes a content manipulation application 110. In some embodiments, executing the program code causes a computing system to output the segmentation model by transmitting the segmentation model from a processing device to a non-transitory computer-readable medium via a data bus of a computing system, thereby making the segmentation available to a content manipulation application 110 that is executed at the computing system. In these various embodiments, the executed content manipulation application 110 applies the segmentation model to segment 3D shapes (e.g., 3D models without labels, 3D models without scene graphs, 3D shapes without any segmentation or hierarchical data, etc.).

Transformation of Feature Vectors into a Common Feature Space

FIGS. 5-8 depict examples related to transformation of feature vectors into a common feature space. In some embodiments, these examples are used for implementing some or all of the operations involved in block 404 of the process 400. But other implementations consistent with this disclosure are possible.

Figure 5:
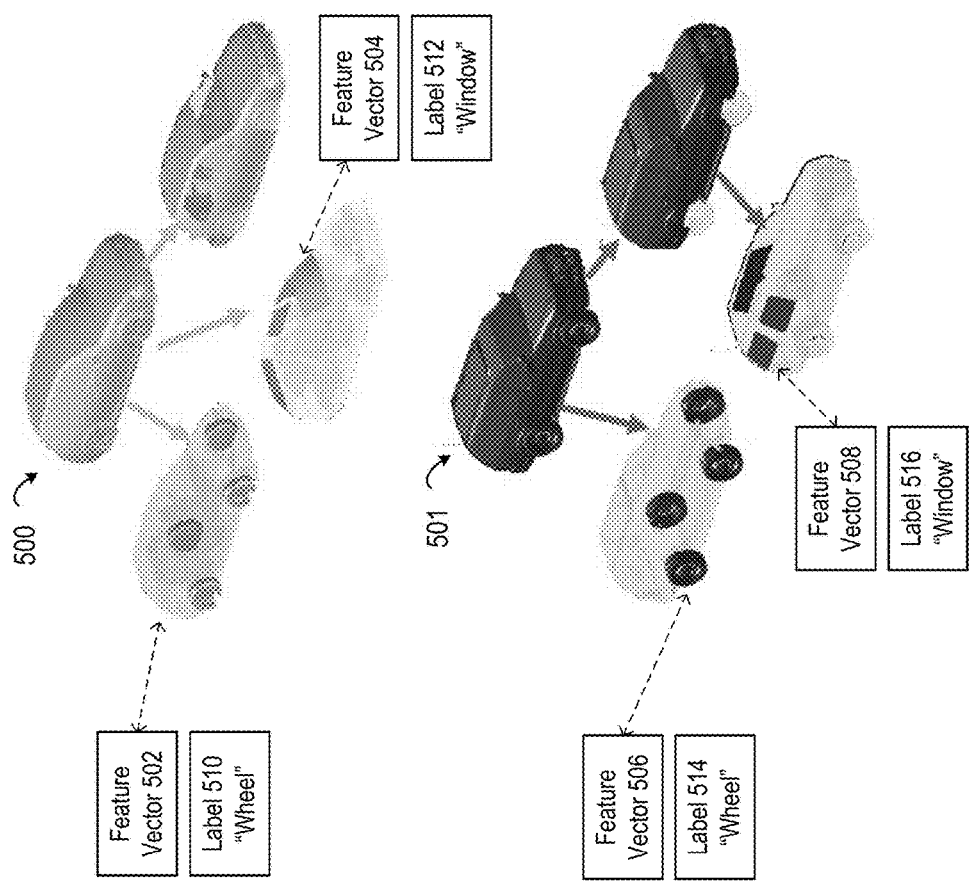
FIG. 5 depicts an example of labeled component shapes from different 3D models in a training dataset being used to generate feature vectors representing the component shapes, according to certain embodiments of the present disclosure.

FIG. 5 depicts an example of labeled component shapes from different 3D models in a training dataset being used to generate feature vectors representing the component shapes, according to certain embodiments of the present disclosure. In this example, two user-provided 3D models 500 and 501 are selected from a training dataset, such as the training data 116. For illustrative purposes, FIG. 5 is described using two training 3D models. But any number of training 3D models from a training dataset may be used.

The segmentation-model-generation module 106 generates or identifies feature vectors 502 and 504 for the user-provided 3D model 500. The feature vector 502 is associated with a user-provided label 510 (i.e., a "wheel" label). The feature vector 504 is associated with a user-provided label 512 (i.e., a "window" label). Each of the feature vectors 502 and 504 numerically encodes data describing one or more features of a component shape, such as the component shape's geometry, spatial configuration, etc.

The segmentation-model-generation module 106 also generates or identifies feature vectors 506 and 508 for the user-provided 3D model 500. The feature vector 506 is associated with a user-provided label 514 (i.e., a "wheel" label). The feature vector 508 is associated with a user-provided label 516 (i.e., a "window" label). Each of the feature vectors 506 and 506 numerically encodes data describing one or more features of a component shape, such as the component shape's geometry, spatial configuration, etc.

Figure 6:
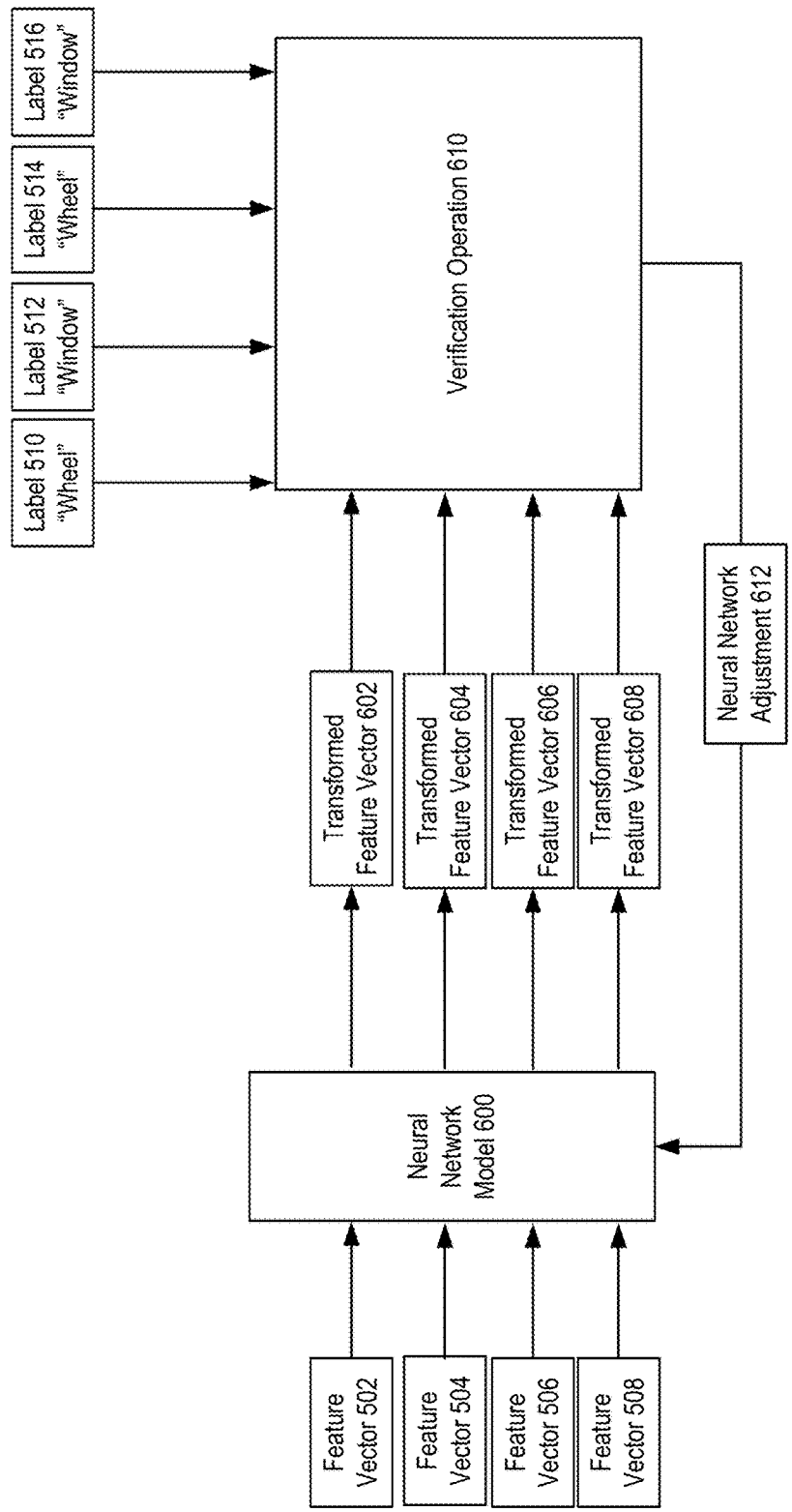
FIG. 6 depicts an example of iteratively training a neural network model to transform the feature vectors depicted in FIG. 5 into a common feature space, according to certain embodiments of the present disclosure.

FIG. 6 depicts an example of iteratively training a neural network model 600 to transform the feature vectors 502, 504, 506, 508 into a common feature space. A non-linear transformation function uses the neural network model 600 to transform an initial feature vector (e.g., one of the feature vectors 502, 504, 506, 508) into a transformed feature vector usable by the segmentation-model-generation module 106 for generating a segmentation model 322.

In this example, the segmentation-model-generation module 106 provides each of the feature vectors 502, 504, 506, 508 as inputs to a neural network model 600. The neural network model 600 includes one or more layers, each of which includes one or more nodes. Applying the neural network model 600 to a particular feature vector can transform the feature vector by modifying data values in various dimensions of the feature vector, combining or removing dimensions of the feature vector, or some combination thereof.

Figure 7:
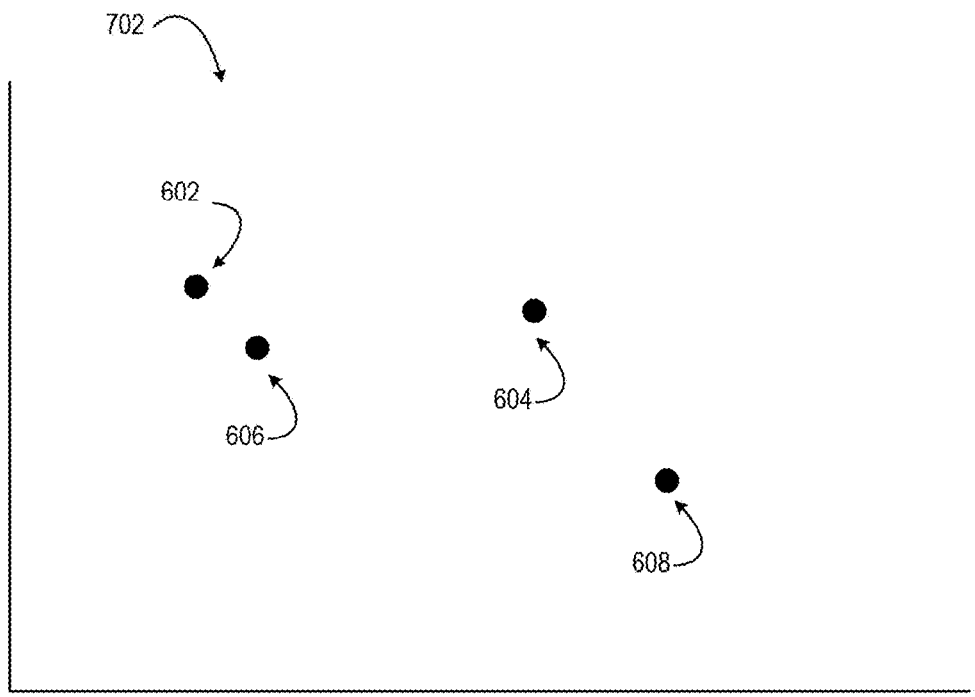
FIG. 7 depicts an example of a feature space that is occupied by transformed feature vectors generated by the neural network model depicted in FIG. 6 before an adjustment to the neural network model, according to certain embodiments of the present disclosure.

The output of the neural network model 600 is a transformed feature vector. For example, the transformed feature vectors 602, 604, 606, 608 are transformed versions of the initial feature vectors 502, 504, 506, 508, respectively. FIG. 7 depicts an example of a feature space 702 that is occupied by transformed feature vectors 602, 604, 606, 608. For illustrative purposes, the feature space 702 is depicted as having two dimensions. But a feature space used by the segmentation-model-generation module 106 can have any number of dimensions.

The segmentation-model-generation module 106 executes a verification operation 610 that determines if the neural network model 600 should be adjusted. In some embodiments, the verification operation involves determining whether points in the feature space 702 are sufficiently close together if these points correspond to similar component shapes, whether points in the feature space 702 are sufficiently far from one another if these points correspond to dissimilar component shapes, or some combination thereof. For instance, if the neural network model 600 is optimized (or otherwise adjusted) to be suitable for use by the segmentation-model-generation module 106, the transformed feature vectors corresponding to similar component shapes should define points that are closer together in the feature space 702. For example, if a transformed feature vector corresponding to the wheel shapes of the car model 500 defines a first point and a transformed feature vector corresponding to the wheel shapes of the car model 501 defines a second point, the first and second points should be closer together in the feature space 702 because the wheel shapes in the 3D models 500, 501 are similar to one another.

In the example depicted in FIG. 7, the transformed feature vectors 602 and 606 define points that are close together (i.e., within a threshold distance of one another) in the feature space 702. The component shapes that respectively correspond to the transformed feature vectors 602 and 606 have identical labels (i.e., the "wheel" tag in labels 510 and 514). The points defined by the transformed feature vectors 602 and 606 are also distant from additional points that are defined by the transformed feature vectors 604 and 608. The component shapes that respectively correspond to the transformed feature vectors 602 and 606 have labels (i.e., the "wheel" tag in labels 510 and 514) that are different from the labels for the component shapes that respectively correspond to the transformed feature vectors 604 and 608. The closeness of transformed feature vectors 602 and 606 and their distance from transformed feature vectors 604 and 608 indicates that the neural network model 600 is transforming feature vectors for "wheel" shapes in a manner that accurately reflects the features of these component shapes.

However, as also depicted in the example of FIG. 7, the transformed feature vectors 604 and 608 define points that are distant from one another (i.e., outside of a threshold distance of one another) in the feature space 702. The component shapes that respectively correspond to the transformed feature vectors 604 and 608 have identical labels (i.e., the "window" tag in labels 512 and 516). The distance between the transformed feature vectors 604 and 608, despite these vectors being associated with identical labels, indicates that the neural network model 600 is not transforming feature vectors for "window" shapes in a manner that accurately reflects the features of these component shapes.

Returning to FIG. 6, if the verification operation 610 identifies one or more errors in the transformed feature vectors (e.g., insufficiently close feature vectors, insufficiently distant feature vectors, etc.), the segmentation-model-generation module 106 performs a neural network adjustment 612. The neural network adjustment 612 includes one or more modifications such as (but not limited to) changing the number of nodes in the neural network model 600, changing the number of layers in the neural network model 600, changing one or more mapping functions used in the neural network model 600, changing the number of dimensions included in a transformed feature vector outputted by the neural network model 600, etc.

Figure 8:
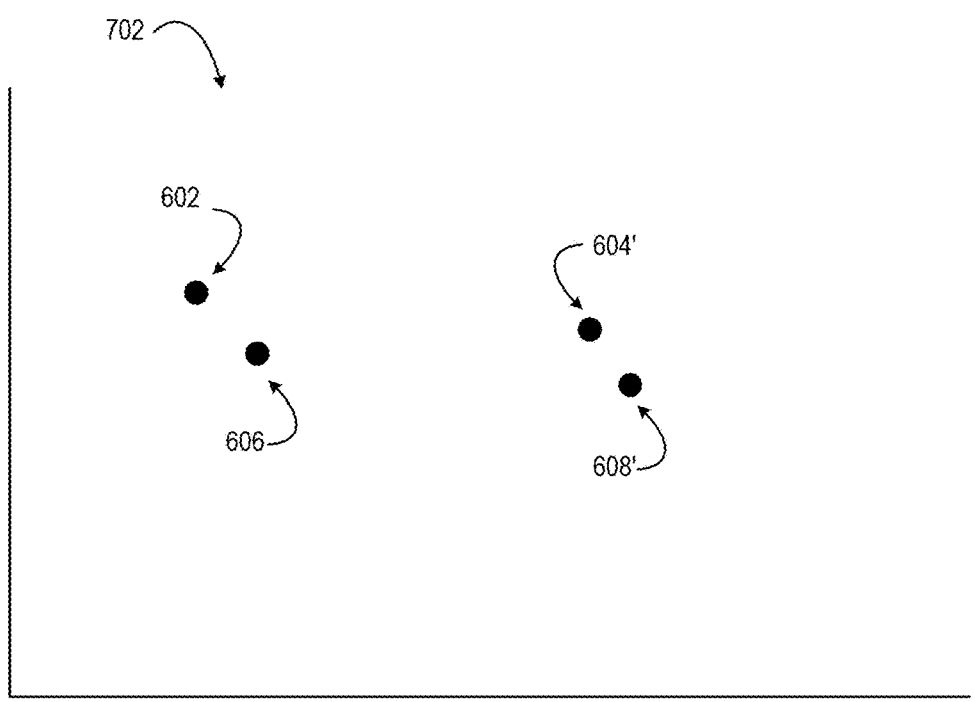
FIG. 8 depicts an example of a feature space that is occupied by transformed feature vectors generated by the neural network model depicted in FIG. 6 after an adjustment to the neural network model, according to certain embodiments of the present disclosure.

FIG. 8 depicts an example of the feature space 702 that is occupied by updated transformed feature vectors that are generated by the neural network model 600 after the neural network adjustment 612 has been applied. In this example, the points defined by the transformed feature vectors 602 and 606 have not changed, since the verification operation 610 indicated that the transformed feature vectors 602 and 606 were sufficiently close to one another based on their corresponding component shapes having identical "wheel" labels. But other points defined by the transformed feature vectors 604' and 608' (i.e., modified versions of the vectors 604 and 608 following the neural network adjustment 612) have moved closer together. In this example, the verification operation 610 indicates that the transformed feature vectors 604' and 608' are sufficiently close to one another based on their corresponding component shapes having identical "window" labels.

The segmentation-model-generation module 106 iteratively performs the process described with respect to FIGS. 6-8 to train the neural network model 600. The segmentation-model-generation module 106 uses available user-provided labels 318 to train the neural network model 600. The trained neural network model 600 is used by the segmentation-model-generation module 106 to implement block 404 of the process 400.

Any suitable verification operation 610 may be used to adjust the neural network model 600. For example, the segmentation-model-generation module 106 can iteratively adjust the neural network such that a suitable loss function is minimized.

An example of such a loss function (or other objective function) is the following softmax loss function:

$$L_{tag}(f(p)) = \sum_{j} \delta(\text{tag}(p) = tag_j) \sum_{i} \frac{\alpha_{ij} \exp^{\theta_i^T f(p)}}{\sum_{k} \exp^{\theta_k^T f(p)}}.$$

In this function, the term L is a loss value for f(p). The term f(p) is a transformed feature vector of a component shape p. The transformed feature vector represents (or "embeds") the component shape in the feature space. The term tag (p) indicates the label (or "tag") of a component shape p. The term δ(•) is an indicator function having a value of 1 if the component shape p has the label j and a value of 0 if the component shape p does not have the label j. The $tag_j$ indicates the $j^{th}$ label in a dictionary of labels (e.g., the set of user-provided labels 318 that the segmentation-model-generation module 106 selects, generates, or otherwise obtains from a larger set of user-provided labels).

The term $$\frac{\exp^{\theta_i^T f(p)}}{\sum_{k} \exp^{\theta_k^T f(p)}}$$

is a softmax function indicating a probability distribution of a component shape p (as indicated by the transformed feature vector f(p)) having a label i out of k possible labels in a set of labels T (e.g., the dictionary of user-provided labels 318 obtained by the segmentation-model-generation module 106). The term θ is a softmax parameter for a set of labels T. The segmentation-model-generation module 106 applies a weight $\alpha_{ij}$ to the softmax function, where the weight $\alpha_{ij}$ is the probability of a true label i being observed as a different label j. A true label i being observed as a different label j can include, for example, a transformed feature vector for a shape that should have a label i (e.g., "window") being positioned in a feature space near a transformed feature vector for a shape having a label j.

In some embodiments, the neural network 600 is iteratively optimized or otherwise adjusted by minimizing this loss function. For example, in each iteration the neural network 600 is used to transform a set of component shapes (e.g., the various training component shapes 316 in the training data 116) into their corresponding transformed feature vectors. The softmax loss function (or another suitable loss function) is calculated using the transformed feature vectors as inputs. The segmentation-model-generation module 106 stores data identifying an output value of the softmax loss function that is computed for each iteration, and also stores data describing a configuration of the neural network 600 at that iteration. In some embodiments, the segmentation-model-generation module 106 analyzes the stored output values of the softmax loss function and identifies a minimum output value from the stored output values. The segmentation-model-generation module 106 selects the stored neural network configuration corresponding to the minimum output value as the optimized neural network. The optimized neural network is used at block 404 of the method 400 described above.

This example of a loss function is provided for illustrative purposes. Other features and examples of a loss function that may be used for training the neural network 600 are described in H. Izadinia et al., "Deep Classifiers from Image Tags in the Wild," ACM, 2015, incorporated by reference herein.

Identification of Component-Shape Groups and Hierarchies

FIGS. 9-12 depict examples related to identification of component-shape groups and hierarchies. In some embodiments, these examples are used for implementing some or all of the operations involved in blocks 406-410 of the process 400. But other implementations consistent with this disclosure are possible.

Figure 9:
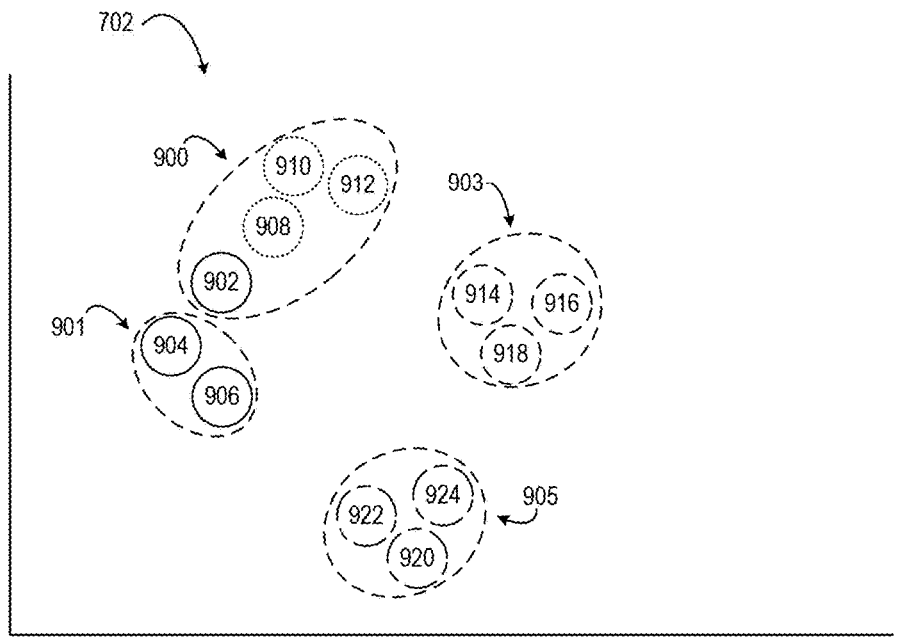
FIG. 9 depicts an example of clustering points defined by transformed feature vectors that are generated using the trained neural network model depicted in FIG. 6, according to certain embodiments of the present disclosure.

FIG. 9 depicts an example of clustering points defined by transformed feature vectors that are generated using, for example, the trained neural network model 600 depicted in FIG. 6. The points depicted in the feature space 702 correspond to various component shapes (e.g., component shapes 902, 904, 906, 908, 910, 912, 914, 916, 918, 920, 922, and 924) from the training data 116.

In some embodiments, the segmentation-model-generation module 106 clusters the points using k-means clustering or some other suitable clustering algorithm (e.g., an expectation maximization operation). The initial clustering operation results in the clusters 900, 901, 903, and 905 depicted in FIG. 9. These clusters, which correspond to groups of component shapes, indicate parts that have the same label or that should have the same label. For example, if two component shapes have similar geometrics features (e.g., the geometry of a wheel), both component shapes should be associated with the same cluster and therefore have the same label.

Figure 10:
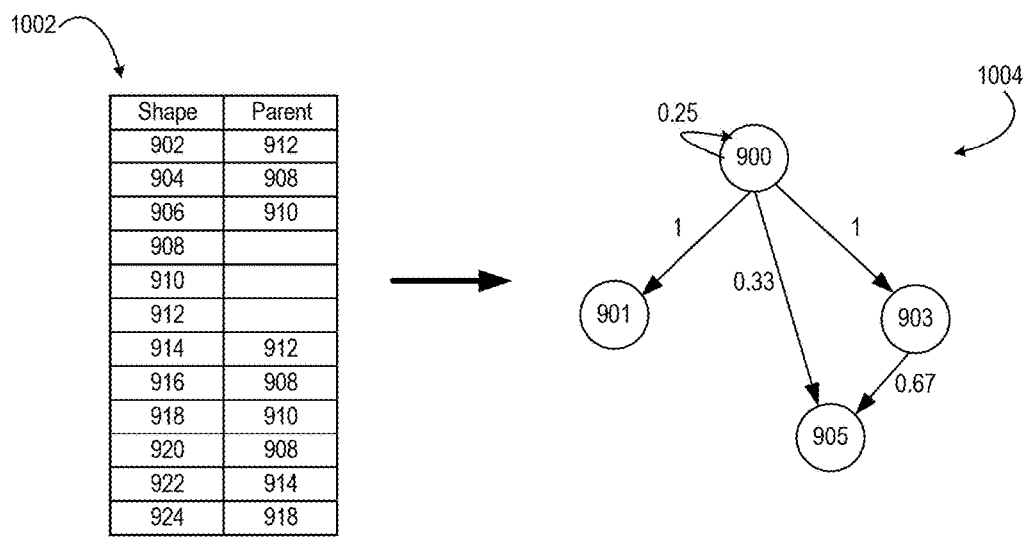
FIG. 10 depicts an example of a directed graph representing a segmentation hierarchy among component-shape groups that correspond to the clusters depicted in FIG. 9, according to certain embodiments of the present disclosure.

The segmentation-model-generation module 106 analyzes the initial clusters 900, 901, 903, and 905 to determine their consistency with hierarchical data included in the user-provided scene graphs 320. For example, FIG. 10 depicts an example of a directed graph 1004 that is generated using hierarchical data 1002. In some embodiments, the hierarchical data 1002 is a subset of the data included in the user-provided scene graphs 320. The segmentation-model-generation module 106 uses the hierarchical data 1002 to build the directed graph 1004, which represents a segmentation hierarchy among component-shape groups that correspond to the clusters 900, 901, 903, and 905.

The weights applied to links in the directed graph 1004 indicate parent-child relationships among members of the clusters corresponding to linked nodes. The links of the graph can be weighted using any suitable statistic associated with the hierarchical relationships among component shapes. An example of a suitable statistic is a statistic indicating how frequently component shapes associated with one cluster are identified, in the scene graphs, as children of component shapes in another cluster. In this example, a given weight of a link between two nodes (which represent respective clusters), indicates a percentage of component shapes in a first cluster that are identified as children of component shapes in a second cluster.

For instance, the segmentation-model-generation module 106 determines that the cluster 901 includes points defined by transformed feature vectors corresponding to component shapes 904 and 906. The segmentation-model-generation module 106 determines, from the hierarchical data 1002, that each of component shapes 904 and 906 has a parent shape corresponding to one of the points in the cluster 900 (i.e., the point corresponding to component shape 908, which is a parent of the component shape 904, and the point corresponding to shape 910, which is a parent of the component shape 906). Thus, because 100% of the component shapes associated with the node for cluster 901 are children of component shapes associated with the node for cluster 900, a weight of "1" is applied to the link between with the nodes for clusters 900 and 901. Similarly, a weight of 0.33 is applied to the link between with the nodes for clusters 900 and 905, thereby indicating that only one-third of the component shapes associated with the node for cluster 905 are children of component shapes associated with the node for cluster 900 (i.e., shape 920 having a component shape 908 as a parent).

In some embodiments, the segmentation-model-generation module 106 optimizes the graph 1004. The optimization operation assesses the assignments of points to different clusters such that component-shape groups are identified (e.g., in block 406) in a manner that accurately reflects the features of the component shapes and the hierarchical relationships among component shapes. The segmentation-model-generation module 106 assesses these assignments based on at least two criteria. The first criterion is a distance between a centroid of a cluster in the feature space 702, where the cluster corresponds to a component-shape group, and a point in the feature space, where the point corresponds to a given component shape in the training data 116. The second criterion is whether a label applied to the group (i.e., the corresponding cluster) is consistent with known hierarchical relationships that are identified from available scene graphs. A group label can be, for example, a user-provided label 318 (or another label derived from one or more user-provided label 318) that is applied to component shapes associated with at least some points in a cluster. For example, if component shapes are associated with a "window" label, that "window" label may be applied to a cluster corresponding to the component shapes that are associated with the "window" label.

Optimizing the directed graph can remove inconsistencies between a label applied to a group (and, by extension, all of the member shapes in that group) and the known hierarchical relationships that are identified from available scene graphs. For instance, in the example depicted in FIG. 10, the graph 1004 includes a circular link, with a weight of 0.25, from the node for cluster 900 to itself. The presence of this link indicates that 25% of the component shapes in the cluster 900 are identified as children of other component shapes in the cluster 900. The presence of this circular link is an inconsistency indicating an error in the grouping of the clusters depicted in FIG. 9.

Figure 11:
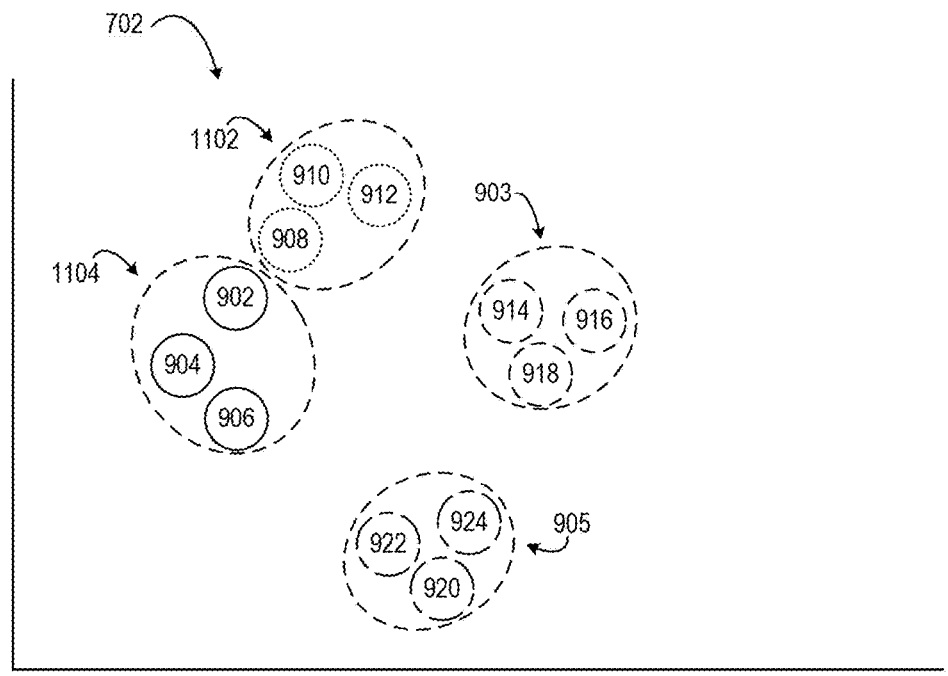
FIG. 11 depicts an example of re-clustering points defined by transformed feature vectors that are generated using the trained neural network model depicted in FIG. 6, according to certain embodiments of the present disclosure.

If the segmentation-model-generation module 106 detects such an inconsistency between the clustering of points and the available hierarchical data, the segmentation-model-generation module 106 re-clusters the points (e.g., by moving or otherwise changing the centroids used for clustering the points). For example, FIG. 11 depicts an example of re-clustering the points for the various component shapes. The re-clustering causes a change from the cluster 900 depicted in FIG. 9 to the cluster 1102 depicted in FIG. 11, as well as a change from the cluster 901 depicted in FIG. 9 to the cluster 1104 depicted in FIG. 11.

In this example, the segmentation-model-generation module 106 reassigns the point corresponding to the component shape 902 to the cluster that includes points corresponding to the component shapes 904 and 906. In some embodiments, the new cluster (i.e., the cluster to which a point is reassigned) is selected based on the new cluster having a threshold number of points within a threshold distance of the point to be reassigned. For example, the cluster that includes points corresponding to the component shapes 904 and 906 (e.g., cluster 1104) may be selected based on a sufficient number of points within the cluster being within a threshold distance of the point corresponding to the component shape 902. The threshold number of points being within the threshold distance to the point corresponding to the component shape 902 indicates that a similarity of the component shape 902 to the component shapes 904 and 906 is greater than or equal to a threshold similarity. In additional or alternative embodiments, the new cluster is selected based on a threshold number of points in the selected cluster corresponding to child component shapes that are identified, in the user-provided scene graphs 320, as children of parent component shapes corresponding to points in the previous cluster. For example, the cluster for the component shapes 904 and 906 (e.g., cluster 1104) may be selected based on a sufficient number of component shapes associated with that cluster being children of component shapes in a cluster to which the component shape 902 was previously assigned (e.g., cluster 900).

Figure 12:
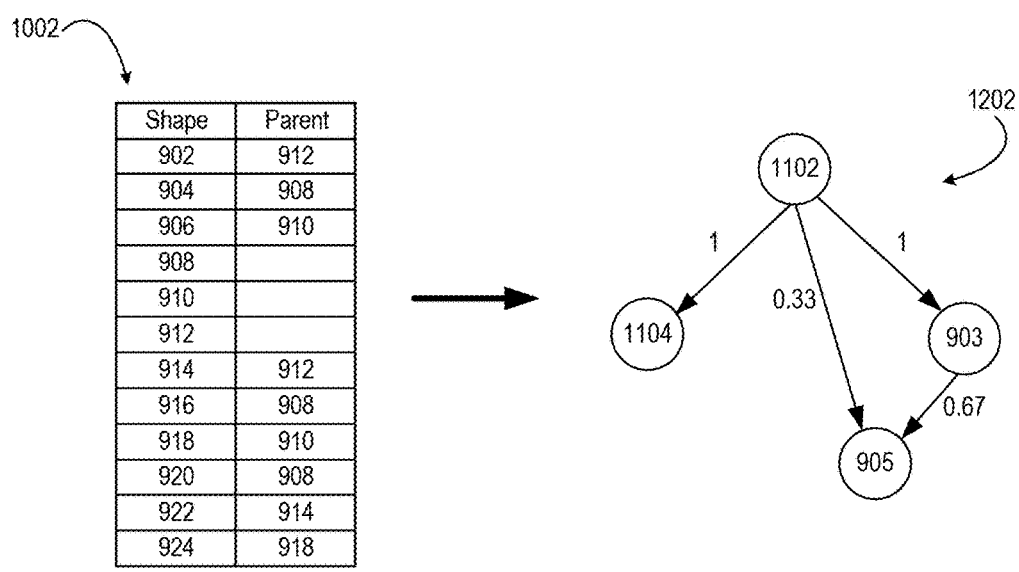
FIG. 12 depicts an example of an updated directed graph representing an updated segmentation hierarchy among component-shape groups that correspond to the modified clusters depicted in FIG. 11, according to certain embodiments of the present disclosure.

The segmentation-model-generation module 106 updates the directed graph to reflect the re-clustered points. For example, FIG. 12 depicts an example of an updated directed graph 1202 that corresponds to the clusters depicted in FIG. 11. In this example, the circular link in the previous directed graph 1004 has been removed. In addition, the weight of the link between the nodes for clusters 1102 and 1104 has not decreased, since each component shape associated with the cluster 1102 still has a parent shape associated with the cluster 1104. Therefore, the segmentation-model-generation module 106 can determine that the clusters depicted in FIG. 11 are more consistent with the available hierarchical information.

The segmentation-model-generation module 106 can iteratively perform the types of operations described above with respect to FIGS. 9-12 to generate a segmentation hierarchy. For example, after one or more iterations, the segmentation-model-generation module 106 can validate the identified component-shape groups with respect to both the centroid-distance criterion and the hierarchy-consistency criterion described above. The validation can indicate that each component shape is assigned to a component-shape group having sufficiently similar component shapes (e.g., based on all points assigned to a corresponding cluster being sufficiently close to the centroid of the cluster). The validation can also indicate that the group assignments accurately reflect the hierarchical information included in the scene graphs 320.

In some embodiments, if the identified component-shape groups are validated, the resulting directed graph can be used as the segmentation hierarchy. In additional or alternative embodiments, the directed graph can be further optimized or otherwise modified so that edges with insufficient weight are eliminated, as described in further detail herein.

The examples described above enable a processing device to receive a 3D model (or other pre-segmented 3D shape) and, even if the component shapes lack labels or hierarchical information, assign the component shapes to particular nodes of a segmentation hierarchy. However, if a 3D shape is not segmented into component shapes, assigning different portions of the 3D shape (e.g., a "wheel" portion of a "car" shape) to certain nodes in the hierarchy may be infeasible.

Figure 13:
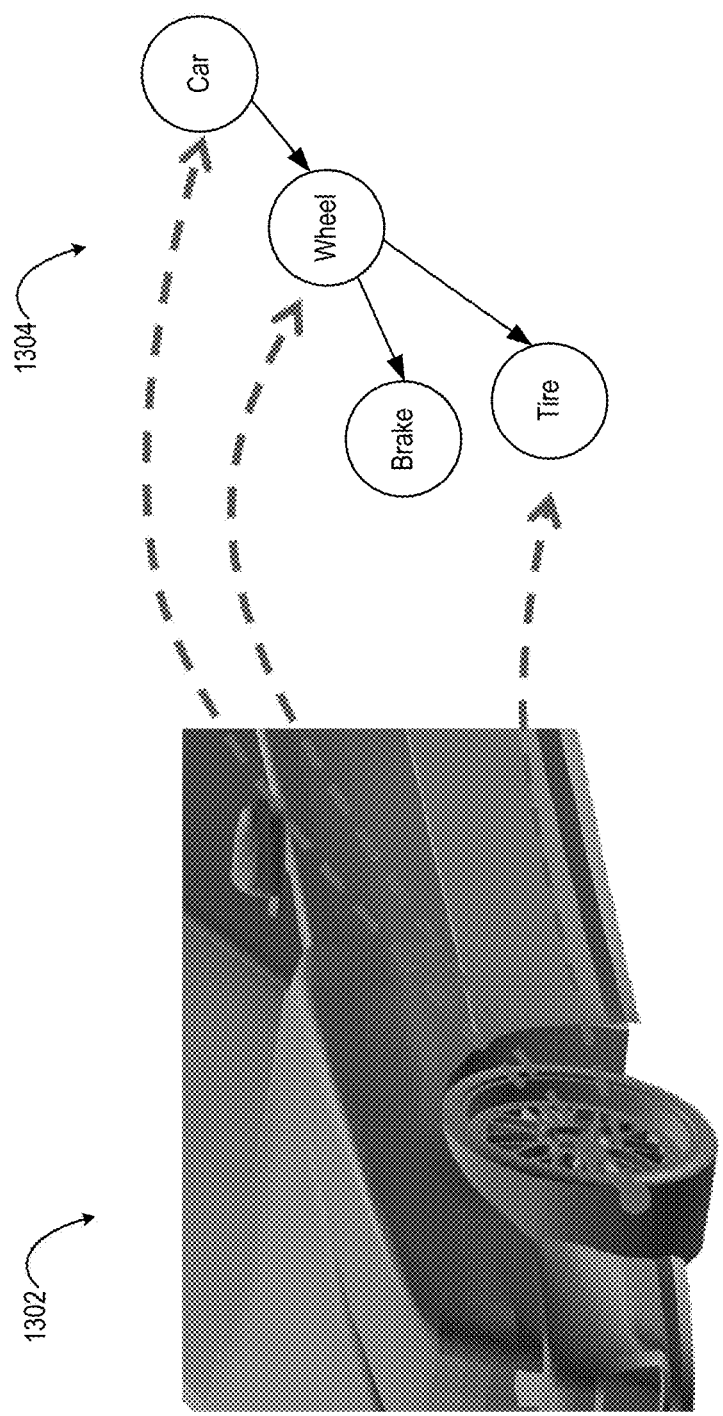
FIG. 13 depicts an example of mapping feature points that are sampled from a portion of a 3D shape to a segmentation hierarchy, according to certain embodiments of the present disclosure.

In some embodiments, the segmentation-model-generation module 106 enables segmentation of such 3D shapes by training a point classifier. For example, FIG. 13 depicts an example of mapping feature points that are sampled from a portion of a 3D shape 1302 to a segmentation hierarchy 1304. In this example, the 3D shape 1302 may lack information identifying certain portions of the 3D shape 1302 as component shapes (e.g., a wheel, a door, etc.). But a point classifier can be trained to learn a correspondence between certain feature points (e.g., points sampled from the surface of a training component shape) and a corresponding node in the segmentation hierarchy 1304. The trained classifier can be used to sample feature points from a portion of the input 3D shape 1302 and match the sampled feature points to one or more nodes of the segmentation hierarchy 1304.

In one example, the segmentation-model-generation module 106 samples feature points from one or more surfaces of one or more component shapes in the component-shape groups. (The component-shape groups are identified by the segmentation-model-generation module 106 using one or more operations described above with respect to FIGS. 5-12.) The segmentation-model-generation module 106 identifies one or more features of these points. Based on these identified features, the segmentation-model-generation module 106 minimizes an loss function that relates a group label to one or more features of a sampled point, where the group label is applied to the component shape from which the point was sampled.

In some embodiments, the segmentation-model-generation module 106 trains the point classifier by iteratively modifying the point classifier such that an associated loss function is minimized. The loss function indicating the probability of a label from a child component shape being erroneously applied to a particular point that is sampled from a parent component shape. For instance, the loss function can model the probability that a point sampled from a "wheel" component will be labeled, based on one or more features of the point, as a "tire" component instead. An example of such an loss function is the following softmax loss formula:

$$L(g(pt_k)) = \sum_j \delta(lpt_k = j) \sum_i \frac{B_{ij} \exp^{\theta_i^T g(pt_k)}}{\sum_m \exp^{\theta_m^T g(pt_k)}}.$$

This loss function is computed based on a likelihood of a feature point being unintentionally labeled as belonging to a child component shape rather than a parent component shape from which the feature point was sampled, where the parent label is the correct label for the point. The classifier algorithm is trained using a relevant set of user-provided labels 318 in the training data 116 (e.g., a set of labels in a dictionary generated by the segmentation-model-generation module 106).

In the example of a loss function provided above, the term $g(pt_k)$ is a feature vector g for a sampled feature point $pt_k$. The segmentation-model-generation module 106 samples the feature point $pt_k$ from one or more component shapes included in the training data 116. The term $lpt_k$ is the label of the component shape from which the feature point $pt_k$ was sampled. The segmentation-model-generation module 106 accesses the labels $lpt_k$ from the user-provided labels 318. Thus, the user-provided labels 318 provide supervision for training the point classifier. The term $\delta(\bullet)$ is an indicator function.

The term $$\frac{\exp^{\theta_i^T g(pt_k)}}{\sum_m \exp^{\theta_m^T g(pt_k)}}$$

is a softmax function indicating a probability distribution of a feature point $pt_k$ (as indicated by the feature vector $g(pt_k)$) being assigned a label i out of m possible labels in a set of labels T (e.g., the dictionary of user-provided labels 318 obtained by the segmentation-model-generation module 106). The term θ is a softmax parameter for a set of labels T. The segmentation-model-generation module 106 applies a weight $\beta_{ij}$ to the softmax function, where the weight $\alpha_{ij}$ is the probability of a feature point being assigned, by the point classifier, a label j for a child component shape rather than a label i for a parent component shape from which the feature point $pt_k$ was sampled. Observing a label i as its child j involves, for example, a particular point $pt_k$ sampled from a component shape with a group label i being erroneously classified as belonging to a child group having a group label j (e.g., being classified as a "tire" instead of a "wheel"). The term θ is a softmax parameter for a set of T labels.

Example of Optimizing Segmentation Hierarchy

A content manipulation application 110 uses the point classifier and the segmentation hierarchy in the segmentation model to segment an input 3D shape 324. For example, the content manipulation application 110 labels parts of an input 3D shape and generates a "soft" hierarchy of the labeled parts (e.g., a hierarchy in which at least some of the nodes have multiple parent nodes, such as the hierarchies depicted by directed graphs 1004 and 1202).

In some embodiments, the segmentation-model-generation module 106 optimizes a soft segmentation hierarchy that is generated for an input 3D shape using the segmentation model 322. For example, a soft segmentation hierarchy can be converted into a "hard" hierarchy so that a particular child node has a specified number of parent nodes (e.g., one parent node for the given child node), rather than the scenario depicted in FIGS. 10 and 12 in which the node for group 905 includes one "parent" node connected by a link with a weight of 0.33 and another "parent" node connected by a link with a weight of 0.67.

In some embodiments, the soft segmentation hierarchy generated using the segmentation model 322, the labels applied using the segmentation model 322, or both are optimized using a multi-level Markov Random Field ("MRF") process. The segmentation-model-generation module 106 uses the point label that is acquired using the multi-level MRF process to find a maximum spanning tree among the nodes of a directed graph corresponding to component-shape groups and associated group parent-child relationships (e.g., the directed graph 1102). The maximum spanning tree is used to generate a segmentation hierarchy in which each child node has only one parent node.

To apply the MRF process, the segmentation-model-generation module 106 obtains a unary term from a deep point labeling network. The segmentation-model-generation module 106 uses horizontal pairwise terms to indicate the smoothness of point labels. The segmentation-model-generation module 106 uses vertical pairwise terms to indicate the parent-to-child relationships among different labels across different levels of hierarchies. The segmentation-model-generation module 106 performs a max inference operation to acquire a point label on different levels simultaneously.

For example, the segmentation-model-generation module 106 may modify one or more aspects of a "soft" segmentation hierarchy (e.g., removing links indicating the parent-child relationships) such that a suitable objective function is optimized. Optimizing the energy function involves, for example, iteratively modifying component-shape groups and group parent-child relationships among the component shapes in the training data 116 and associated groups. Optimizing an energy function may include minimizing an energy function that represents a negative-log likelihood (and thereby maximizes an associated probability).

An example a suitable objective function is the following energy function:

$$E = -\sum_{k,l} \log(P(cc_{k,l})) + \lambda_1 \sum_l \sum_{k,j \in E} \varphi_{horiz}(cc_{k,l}, cc_{j,l}) + \lambda_2 \sum_k \sum_{l_1,l_2} \varphi_{vert}(cc_{k,l_1}, cc_{k,l_2}).$$

In this example, the first term is the probability of a certain component shape having a certain label. The probability is determined from a soft hierarchy that is developed for the input 3D shape 324 using the segmentation model 322. The second term is a horizontal term that models constraints applied to component shapes in the same level of a segmentation hierarchy. Examples of these constraints include, for example, "body" and "wheel" shapes being in different clusters, all "wheel" shapes being in the same cluster, etc. The third term is a vertical term that models constraints across levels of a hierarchy (e.g., a point or component shape being labeled as a "car," "wheel," or "bolt" depending on the level of the segmentation hierarchy).

In this example, the term $cc_{k,l}$ is a component shape k having the label l. The term $P(cc_{k,l})$ is the probability of the component shape k being assigned the label l. The term $\varphi_{horiz}(CC_{k,l}, CC_{j,l})$ is an energy function models certain constraints associated with a certain label across different component shapes in the same level of a hierarchy. For example, the $\varphi_{horiz}(cc_{k,l}, cc_{j,l})$ indicates that two component shapes k and j do not have the same label l, even though the component shapes k and j are associated with transformed feature vectors that are positioned within a threshold distance of one another in a feature space. The term $\varphi_{vert}(cc_{k,l_1}, cc_{k,l_2})$ is an energy function models constraints with respect to a particular component shape across multiple levels of a segmentation hierarchy. For example, the $\varphi_{vert}(cc_{k,l_1}, cc_{k,l_2})$ function indicates that a particular component shape k is assigned to two different parent groups having respective labels $l_1$ and $l_2$ at different levels of the segmentation hierarchy.

In this example, the segmentation-model-generation module 106 performs an MRF optimization with respect to a soft segmentation hierarchy using a graph-cut operation. The graph-cut operation minimizes the energy function (which, in these embodiments, is equivalent to maximizing probability). Minimizing the energy function causes as least some of the edges in the segmentation hierarchy to be removed. In some embodiments, minimizing the energy function also causes certain parts from an input 3D shape to be relabeled (e.g., nearby labeled component shapes in the same level of a hierarchy).

Example of a Computing System for Providing a Segmentation Model

Figure 14:
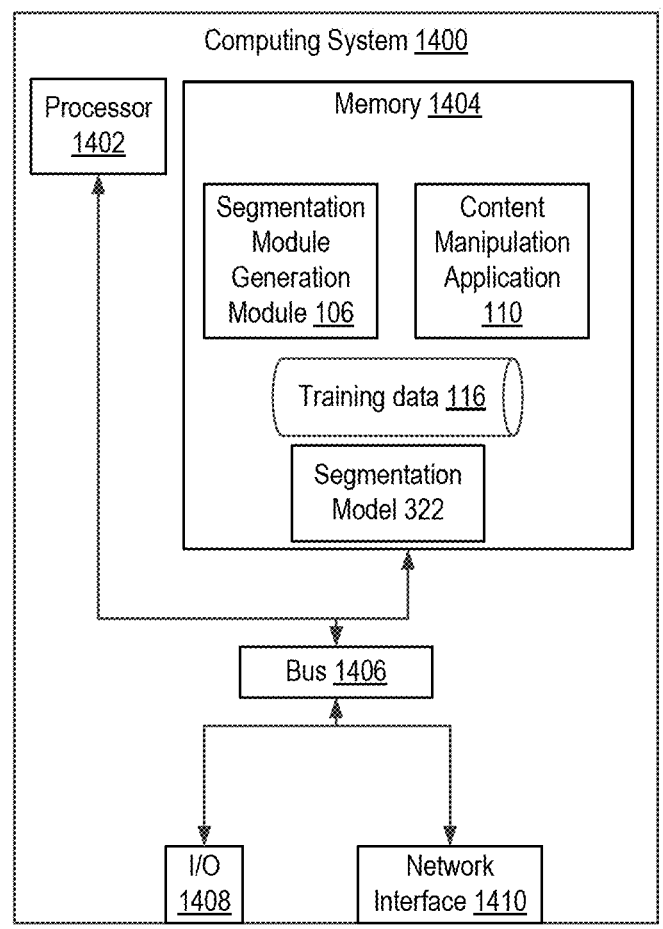
FIG. 14 depicts an example of a computing system that performs certain operations described herein, according to certain embodiments of the present disclosure.

Any suitable computing system or group of computing systems can be used for performing the operations described herein. For example, FIG. 14 depicts examples of computing system 1400 that executes a segmentation-model-generation module 106. In some embodiments, the computing system 1400 also executes the content manipulation application 110, as depicted in FIG. 14. In other embodiments, a separate computing system having devices similar to those depicted in FIG. 14 (e.g., a processor, a memory, etc.) executes the content manipulation application 110.

The depicted examples of a computing system 1400 includes a processor 1402 communicatively coupled to one or more memory devices 1404. The processor 1402 executes computer-executable program code stored in a memory device 1404, accesses information stored in the memory device 1404, or both. Examples of the processor 1402 include a microprocessor, an application-specific integrated circuit ("ASIC"), a field-programmable gate array ("FPGA"), or any other suitable processing device. The processor 1402 can include any number of processing devices, including a single processing device.

The memory device 1404 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1400 may also include a number of external or internal devices, such as input or output devices. For example, the computing system 1400 is shown with one or more input/output ("I/O") interfaces 1408. An I/O interface 1408 can receive input from input devices or provide output to output devices. One or more buses 1406 are also included in the computing system 1400. The bus 1406 communicatively couples one or more components of a respective one of the computing system 1400.

The computing system 1400 executes program code that configures the processor 1402 to perform one or more of the operations described herein. The program code includes, for example, the segmentation-model-generation module 106, the content manipulation application 110, or other suitable applications that perform one or more operations described herein. The program code may be resident in the memory device 1404 or any suitable computer-readable medium and may be executed by the processor 1402 or any other suitable processor. In some embodiments, both the segmentation-model-generation module 106 and the content manipulation application 110 are stored in the memory device 1404, as depicted in FIG. 14. In additional or alternative embodiments, one or more of the segmentation-model-generation module 106 and the content manipulation application 110 are stored in different memory devices of different computing systems. In additional or alternative embodiments, the program code described above is stored in one or more other memory devices accessible via a data network.

The computing system 1400 can access one or more of the training data 116 and the trained segmentation model 322 in any suitable manner. In some embodiments, some or all of one or more of these data sets, models, and functions are stored in the memory device 1404, as in the example depicted in FIG. 14. For example, a computing system 1400 that executes the segmentation-model-generation module 106 can provide access to the trained segmentation model 322 by external systems that execute the content manipulation application 110.

In additional or alternative embodiments, one or more of these data sets, models, and functions are stored in the same memory device (e.g., one of the memory device 1404). For example, a common computing system, such as the creative apparatus 104 depicted in FIG. 1, can host the segmentation-model-generation module 106 and the content manipulation application 110 as well as the trained segmentation model 322. In additional or alternative embodiments, one or more of the programs, data sets, models, and functions described herein are stored in one or more other memory devices accessible via a data network.

The computing system 1400 also includes a network interface device 1410. The network interface device 1410 includes any device or group of devices suitable for establishing a wired or wireless data connection to one or more data networks. Non-limiting examples of the network interface device 1410 include an Ethernet network adapter, a modem, and/or the like. The computing system 1400 is able to communicate with one or more other computing devices (e.g., a computing device executing a content manipulation application 110) via a data network using the network interface device 1410.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   accessing, from a memory device, training data comprising a set of 3D models with a set of user-provided labels and a set of user-provided scene graphs, wherein a 3D model in the set of 3D models comprises a set of component shapes tagged with a subset of the set of user-provided labels, wherein the component shapes of the 3D model have model parent-child relationships described by a subset of the user-provided scene graphs;

generating, by a processing device and from the training data, a segmentation model, wherein generating the segmentation model includes:

transforming, with a neural network model learned from the user-provided labels, feature vectors representing the component shapes of the 3D models into transformed feature vectors identifying points in a multi-dimensional feature space;

grouping the points in the multi-dimensional feature space into clusters;

detecting, based on the user-provided scene graphs, an inconsistency in a first cluster from the clusters, wherein the inconsistency occurs due to the first cluster comprising a first point corresponding to a first component shape and a second point corresponding to a second component shape, and wherein the first component shape is identified as a child of the second component shape in at least one user-provided scene graph of the set of user-provided scene graphs;

modifying, based on the detected inconsistency, the first cluster such that the first point is included in a second cluster;

deriving component-shape groups from the modified cluster, wherein each component-shape group includes a respective subset of the component shapes from the 3D models and is associated with a respective label obtained from a respective corresponding subset of the user-provided labels; and training a segmentation algorithm of the segmentation model based on the component-shape groups identified from the clusters; and outputting, by the processing device, the segmentation model having the trained segmentation algorithm.

2. The method of claim 1, further comprising training the neural network model by performing, by the processing device, operations comprising:

selecting, from the feature vectors representing the component shapes, a first training feature vector and a second training feature vector, wherein the first training feature vector represents a component shape having a training label from the user-provided labels and the second training feature vector represents an additional component shape having the training label;

transforming, with the neural network model, the first training feature vector and the second training feature vector into a first transformed feature vector and a second transformed feature vector, respectively;

determining, based on the training label and a loss function, that a first distance between the first transformed feature vector and the second transformed feature vector exceeds a threshold;

adjusting the neural network model based on the first transformed feature vector and the second transformed feature vector exceeds the threshold;

transforming, with the neural network model as adjusted, the first training feature vector and the second training feature vector into a first adjusted transformed feature vector and a second adjusted transformed feature vector, respectively; and determining, based on the training label and the loss function, that a second distance between the first adjusted transformed feature vector and the second adjusted transformed feature vector is less than the threshold.

3. The method of claim 1, wherein the training data comprises an un-labeled component shape lacking training labels in the user-provided labels, wherein the method further comprises:

transforming, with the neural network model trained from the user-provided labels, an additional feature vector representing the un-labeled component shape into an additional transformed feature vector in the multi-dimensional feature space;

identifying, for the additional transformed feature vector, a neighboring transformed feature vector that is associated with a labeled component shape; and applying a label from the labeled component shape to the un-labeled component shape.

4. The method of claim 1, wherein modifying the first cluster comprises:

selecting the second cluster based on the second cluster having a threshold number of additional points within a threshold distance of the first point, wherein the threshold number of additional points being within the threshold distance indicates the first component shape has a threshold similarity to additional component shapes corresponding to the additional points; and assigning the first point to the second cluster.

5. The method of claim 1, wherein modifying the first cluster comprises:

selecting the second cluster based on the second cluster having a threshold number of points corresponding to child component shapes that are identified, in the user-provided scene graphs, as children of parent component shapes corresponding to points in the first cluster; and assigning the first point to the second cluster.

6. The method of claim 1, wherein training the segmentation algorithm comprises:

identifying a component shape that is a parent of an additional component shape;

identifying, from the user-provided labels, a first label of the component shape that is the parent and a second label of the additional component shape; and iteratively modifying a point classifier such that an energy function associated with the point classifier is minimized, wherein the energy function indicates a probability of the point classifier applying the second label rather than the first label to the component shape that is the parent.

7. The method of claim 1, wherein training the segmentation algorithm comprises:

determining, from the user-provided scene graphs, group parent-child relationships for the component-shape groups, wherein a group parent-child relationship between a first component-shape group and a second component-shape group is determined based on a number of first component shapes in the first component-shape group being identified by the user-provided scene graphs as parents of second component shapes in the second component-shape group;

generating a segmentation hierarchy comprising nodes that respectively correspond to the component-shape groups and links among the nodes that respectively correspond to the group parent-child relationships; and training, based on the clusters and feature points sampled from the component shapes, a point classifier to recognize a correspondence between an input feature point sampled from an input 3D shape and a node of the segmentation hierarchy, wherein the segmentation model includes the trained point classifier and the segmentation hierarchy.

8. The method of claim 7, further comprising segmenting an input 3D shape by performing operations comprising:
generating, using the trained point classifier and based on the segmentation hierarchy from the segmentation model, an initial segmentation hierarchy and an initial set of label for component shapes of the input 3D shape; and
optimizing the initial segmentation hierarchy by maximizing an energy function having a first term indication a probability of a particular component shape having a first label, a second term indicating constraints applied to component shapes in a common level of the initial segmentation hierarchy, and a third term indicating constraints applied to a component shape across different levels of the initial segmentation hierarchy,
wherein maximizing the energy function (i) generates an output segmentation hierarchy from the initial segmentation hierarchy by removing one or more parent-child relationships from the initial segmentation hierarchy and (ii) generates an output set of labels from the initial set of labels by modifying labels applied to the component shapes of the input 3D shape.

9. A system comprising:
means for accessing training data comprising a set of 3D models with a set of user-provided labels and a set of user-provided scene graphs, wherein a 3D model in the set of 3D models comprises a set of component shapes tagged with a subset of the set of user-provided labels, wherein the component shapes of the 3D model have model parent-child relationships described by a subset of the user-provided scene graphs;
means for transforming, with a neural network model learned from the user-provided labels, feature vectors representing the component shapes of the 3D models into transformed feature vectors identifying points in a multi-dimensional feature space;
means for grouping the points in the multi-dimensional feature space into clusters;
means for detecting, based on the user-provided scene graphs, an inconsistency in a first cluster from the clusters, wherein the inconsistency occurs due to the first cluster comprising a first point corresponding to a first component shape and a second point corresponding to a second component shape, and wherein the first component shape is identified as a child of the second component shape in at least one user-provided scene graph of the set of user-provided scene graphs;
means for modifying, based on the detected inconsistency, the first cluster such that the first point is included in a second cluster;
means for deriving component-shape groups from the modified cluster, wherein each component-shape group includes a respective subset of the component shapes from the 3D models and is associated with a respective label obtained from a respective corresponding subset of the user-provided labels;
means for training a segmentation algorithm of a segmentation model based on the component-shape groups identified from the clusters; and
means for outputting the segmentation model having the trained segmentation algorithm.

10. The system of claim 9, further comprising means for training the neural network model by performing operations comprising:
selecting, from the feature vectors representing the component shapes, a first training feature vector and a second training feature vector, wherein the first training feature vector represents a component shape having a training label from the user-provided labels and the second training feature vector represents an additional component shape having the training label;
transforming, with the neural network model, the first training feature vector and the second training feature vector into a first transformed feature vector and a second transformed feature vector, respectively;
determining, based on the training label and a loss function, that a first distance between the first transformed feature vector and the second transformed feature vector exceeds a threshold;
adjusting the neural network model based on the first transformed feature vector and the second transformed feature vector exceeds the threshold;
transforming, with the neural network model as adjusted, the first training feature vector and the second training feature vector into a first adjusted transformed feature vector and a second adjusted transformed feature vector, respectively; and
determining, based on the training label and the loss function, that a second distance between the first adjusted transformed feature vector and the second adjusted transformed feature vector is less than the threshold.

11. The system of claim 9, wherein the training data comprises an un-labeled component shape lacking training labels in the user-provided labels, wherein the system further comprises:
means for transforming, with the neural network model trained from the user-provided labels, an additional feature vector representing the un-labeled component shape into an additional transformed feature vector in the multi-dimensional feature space;
means for identifying, for the additional transformed feature vector, a neighboring transformed feature vector that is associated with a labeled component shape; and
means for applying a label from the labeled component shape to the un-labeled component shape.

12. The system of claim 9, further comprising:
means for determining, from the user-provided scene graphs, group parent-child relationships for the component-shape groups, wherein a group parent-child relationship between a first component-shape group and a second component-shape group is determined based on a number of first component shapes in the first component-shape group being identified by the user-provided scene graphs as parents of second component shapes in the second component-shape group;
means for generating a segmentation hierarchy comprising nodes that respectively correspond to the component-shape groups and links among the nodes that respectively correspond to the group parent-child relationships;
means for training, based on the clusters and feature points sampled from the component shapes, a point classifier to recognize a correspondence between an input feature point sampled from an input 3D shape and a node of the segmentation hierarchy, wherein training the point classifier comprises:
  identifying a component shape that is a parent of an additional component shape;
  identifying, from the user-provided labels, a first label of the component shape that is the parent and a second label of the additional component shape; and
  iteratively modifying the point classifier such that an energy function associated with the point classifier is minimized, wherein the energy function indicates a probability of the point classifier applying the second label rather than the first label to the component shape that is the parent,
wherein the segmentation model includes the trained point classifier and the segmentation hierarchy.

13. The system of claim 9, further comprising means for segmenting an input 3D shape by performing operations comprising:
  generating, using a trained point classifier and based on a segmentation hierarchy from the segmentation model, an initial segmentation hierarchy and an initial set of label for component shapes of the input 3D shape; and
  optimizing the initial segmentation hierarchy by maximizing an energy function having a first term indication a probability of a particular component shape having a first label, a second term indicating constraints applied to component shapes in a common level of the initial segmentation hierarchy, and a third term indicating constraints applied to a component shape across different levels of the initial segmentation hierarchy,
  wherein maximizing the energy function (i) generates an output segmentation hierarchy from the initial segmentation hierarchy by removing one or more parent-child relationships from the initial segmentation hierarchy and (ii) generates an output set of labels from the initial set of labels by modifying labels applied to the component shapes of the input 3D shape.

14. A non-transitory computer-readable medium having program code that is stored thereon and that is executable by a processing device for performing operations, the operations comprising:
  accessing training data comprising a set of 3D models with a set of user-provided labels and a set of user-provided scene graphs, wherein a 3D model in the set of 3D models comprises a set of component shapes tagged with a subset of the set of user-provided labels, wherein the component shapes of the 3D model have model parent-child relationships described by a subset of the user-provided scene graphs;
  generating, from the training data, a segmentation model by performing operations comprising:
    transforming, with a neural network model learned from the user-provided labels, feature vectors representing the component shapes of the 3D models into transformed feature vectors identifying points in a multi-dimensional feature space;
    grouping the points in the multi-dimensional feature space into clusters;
    detecting, based on the user-provided scene graphs, an inconsistency in a first cluster from the clusters, wherein the inconsistency occurs due to the first cluster comprising a first point corresponding to a first component shape and a second point corresponding to a second component shape, and wherein the first component shape is identified as a child of the second component shape in at least one user-provided scene graph of the set of user-provided scene graphs;
    modifying, based on the detected inconsistency, the first cluster such that the first point is included in a second cluster;
    deriving component-shape groups from the modified cluster, wherein each component-shape group includes a respective subset of the component shapes from the 3D models and is associated with a respective label obtained from a respective corresponding subset of the user-provided labels;
    determining, from the user-provided scene graphs, group parent-child relationships for the component-shape groups, wherein a group parent-child relationship between a first component-shape group and a second component-shape group is determined based on a number of first component shapes in the first component-shape group being identified by the user-provided scene graphs as parents of second component shapes in the second component-shape group;
    generating a segmentation hierarchy comprising nodes that respectively correspond to the component-shape groups and links among the nodes that respectively correspond to the group parent-child relationships; and
    training, based on the clusters and feature points sampled from the component shapes, a point classifier to recognize a correspondence between an input feature point sampled from an input 3D shape and a node of the segmentation hierarchy; and
  outputting the segmentation model having the trained point classifier and the segmentation hierarchy.

15. The non-transitory computer-readable medium of claim 14, the operations further comprising training the neural network model by performing additional operations comprising:
  selecting, from the feature vectors representing the component shapes, a first training feature vector and a second training feature vector, wherein the first training feature vector represents a component shape having a training label from the user-provided labels and the second training feature vector represents an additional component shape having the training label;
  transforming, with the neural network model, the first training feature vector and the second training feature vector into a first transformed feature vector and a second transformed feature vector, respectively;
  determining, based on the training label and a loss function, that a first distance between the first transformed feature vector and the second transformed feature vector exceeds a threshold;
  adjusting the neural network model based on the first transformed feature vector and the second transformed feature vector exceeds the threshold;
  transforming, with the neural network model as adjusted, the first training feature vector and the second training feature vector into a first adjusted transformed feature vector and a second adjusted transformed feature vector, respectively; and
  determining, based on the training label and the loss function, that a second distance between the first adjusted transformed feature vector and the second adjusted transformed feature vector is less than the threshold.

16. The non-transitory computer-readable medium of claim 14, wherein the training data comprises an un-labeled component shape lacking training labels in the user-provided labels, wherein the operations further comprise:

transforming, with the neural network model trained from the user-provided labels, an additional feature vector representing the un-labeled component shape into an additional transformed feature vector in the multi-dimensional feature space;

identifying, for the additional transformed feature vector, a neighboring transformed feature vector that is associated with a labeled component shape; and applying a label from the labeled component shape to the un-labeled component shape.

17. The non-transitory computer-readable medium of claim 14, wherein training the point classifier comprises:

identifying a component shape that is a parent of an additional component shape;

identifying, from the user-provided labels, a first label of the component shape that is the parent and a second label of the additional component shape; and iteratively modifying the point classifier such that an energy function associated with the point classifier is minimized, wherein the energy function associated with the point classifier indicates a probability of the point classifier applying the second label rather than the first label to the component shape that is the parent, wherein the operations further comprise segmenting an input 3D shape by performing additional operations comprising:

generating, using the trained point classifier and based on the segmentation hierarchy from the segmentation model, an initial segmentation hierarchy and an initial set of label for component shapes of the input 3D shape, and optimizing the initial segmentation hierarchy by maximizing an energy function having a first term indication a probability of a particular component shape having a particular label, a second term indicating constraints applied to component shapes in a common level of the initial segmentation hierarchy, and a third term indicating constraints applied to a component shape across different levels of the initial segmentation hierarchy, wherein maximizing the energy function (i) generates an output segmentation hierarchy from the initial segmentation hierarchy by removing one or more parent-child relationships from the initial segmentation hierarchy and (ii) generates an output set of labels from the initial set of labels by modifying labels applied to the component shapes of the input 3D shape.

* * * * *